United States Patent
Van Gerwen

(10) Patent No.: US 12,150,470 B2
(45) Date of Patent: *Nov. 26, 2024

(54) METHODS FOR FILLING CAVITIES IN A MOULD MEMBER

(71) Applicant: GEA Food Solutions Bakel B.V., Bakel (NL)

(72) Inventor: Hendrikus Petrus Gerardus Van Gerwen, Someren (NL)

(73) Assignee: GEA Food Solutions Bakel B.V., Bakel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,136

(22) Filed: Jul. 7, 2022

(65) Prior Publication Data

US 2022/0338527 A1    Oct. 27, 2022

Related U.S. Application Data

(62) Division of application No. 15/035,664, filed as application No. PCT/EP2014/075683 on Nov. 26, 2014, now Pat. No. 11,412,773.

(30) Foreign Application Priority Data

Dec. 2, 2013  (EP) .................................... 13195369

(51) Int. Cl.
*A23P 30/10*   (2016.01)
*A22C 7/00*   (2006.01)

(52) U.S. Cl.
CPC ............ *A23P 30/10* (2016.08); *A22C 7/0069* (2013.01); *A22C 7/0076* (2013.01); *A22C 7/0084* (2013.01)

(58) Field of Classification Search
CPC ..... A23P 30/10; A22C 7/0069; A22C 7/0076; A22C 7/0084; A22C 7/00
See application file for complete search history.

(56) References Cited

U.S. PATENT DOCUMENTS 4,112,545 A * 9/1978 Covington ............... A22C 7/00
                                                           426/513
4,165,818 A * 8/1979 Bernard ................. A23B 4/064
                                                            222/53

(Continued)

FOREIGN PATENT DOCUMENTS

CN           1949981 A       4/2007
CN         101835388 A       9/2010

(Continued)

OTHER PUBLICATIONS

"Pressure and its many facets." Aug. 2012. < https://www.pumpfundamentals.com/pressure.htm>. Accessed Apr. 10, 2024. (Year : 2012).*

(Continued)

*Primary Examiner* — Ericson M Lachica

(74) *Attorney, Agent, or Firm* — The Dobrusin Law Firm, P.C.

(57) ABSTRACT

This invention relates to a method for moulding products from a mass of food stuff, comprising: —moving a mould cavity, which is part of a mould member past a feed channel which fills the mass into the cavity, wherein the feed channel is connected to a feed pump which pumps the mass through the feed channel into the cavities. —determining and/or detecting the position of the mould cavity relative to the feed channel, controlling the desired set pressure of the pump.

5 Claims, 22 Drawing Sheets

(56) References Cited

U.S. PATENT DOCUMENTS

| | | | | |
|---|---|---|---|---|
| 4,182,003 | A | * | 1/1980 | Lamartino ............... A22C 7/00 425/572 |
| 4,195,489 | A | * | 4/1980 | Bernard ................. A23L 3/362 62/320 |
| 4,273,789 | A | * | 6/1981 | Zimmerman ............ A22C 7/00 264/40.5 |
| 4,356,595 | A | | 11/1982 | Sandberg et al. |
| 4,422,372 | A | * | 12/1983 | Hoezee ................. B30B 11/227 241/82.5 |
| 5,402,711 | A | * | 4/1995 | Vander Cruyssen ....................... A22C 7/0015 99/427 |
| 6,156,358 | A | * | 12/2000 | Soper ...................... A22C 7/00 99/426 |
| 8,962,055 | B2 | | 2/2015 | Groneberg-Nienstedt |
| 10,681,919 | B2 | * | 6/2020 | Van Gerwen ........... B65B 25/08 |
| 11,412,773 | B2 | * | 8/2022 | Van Gerwen ........ A22C 7/0069 |
| 2001/0009097 | A1 | | 7/2001 | Cathenaut et al. |
| 2002/0012731 | A1 | | 1/2002 | Van Esbroeck et al. |
| 2005/0013895 | A1 | * | 1/2005 | Azzar ..................... A23P 30/10 425/572 |
| 2005/0153039 | A1 | * | 7/2005 | Gosz ................... A22C 7/0084 426/512 |
| 2006/0040028 | A1 | * | 2/2006 | Larson .................... A23P 30/20 426/518 |
| 2006/0157388 | A1 | * | 7/2006 | Blaine ..................... A22C 7/00 209/3.2 |
| 2007/0224305 | A1 | | 9/2007 | Meskendahl |
| 2008/0233228 | A1 | * | 9/2008 | Lindee ................. A22C 7/0084 425/144 |
| 2012/0015065 | A1 | | 1/2012 | Van Der Eerden et al. |
| 2012/0045534 | A1 | | 2/2012 | Lindee et al. |
| 2013/0224357 | A1 | | 8/2013 | Van Gerwen |
| 2014/0141135 | A1 | | 5/2014 | Van Doom et al. |
| 2014/0199423 | A1 | * | 7/2014 | Righolt ................ A22C 7/0092 425/149 |
| 2014/0302208 | A1 | | 10/2014 | Theodorus Van Esbroeck et al. |
| 2014/0342072 | A1 | | 11/2014 | Van Gerwen |
| 2015/0044335 | A1 | | 2/2015 | Meulendijks et al. |
| 2015/0208674 | A1 | * | 7/2015 | Van Zoelen ......... A22C 7/0069 425/441 |
| 2015/0250226 | A1 | | 9/2015 | Van Der Eerden et al. |

FOREIGN PATENT DOCUMENTS

| | | |
|---|---|---|
| CN | 103188953 A | 7/2013 |
| EP | 2410864 A1 | 2/2012 |
| JP | 2002-530096 A | 9/2002 |
| NL | 2008223 C | 8/2013 |
| RU | 2229239 C2 | 5/2004 |
| WO | 0030458 A1 | 6/2000 |
| WO | 2012/161577 A | 9/2010 |
| WO | 2010110655 A1 | 9/2010 |
| WO | 2012161577 A1 | 11/2012 |
| WO | 2013107815 A1 | 7/2013 |

OTHER PUBLICATIONS

Japanese Office Action for Japanese Patent Application No. 2016-535036; dated Apr. 19, 2019.
International Search Report and Written Opinion for Application No. PCT/EP2014/075502, dated Feb. 9, 2015.

* cited by examiner

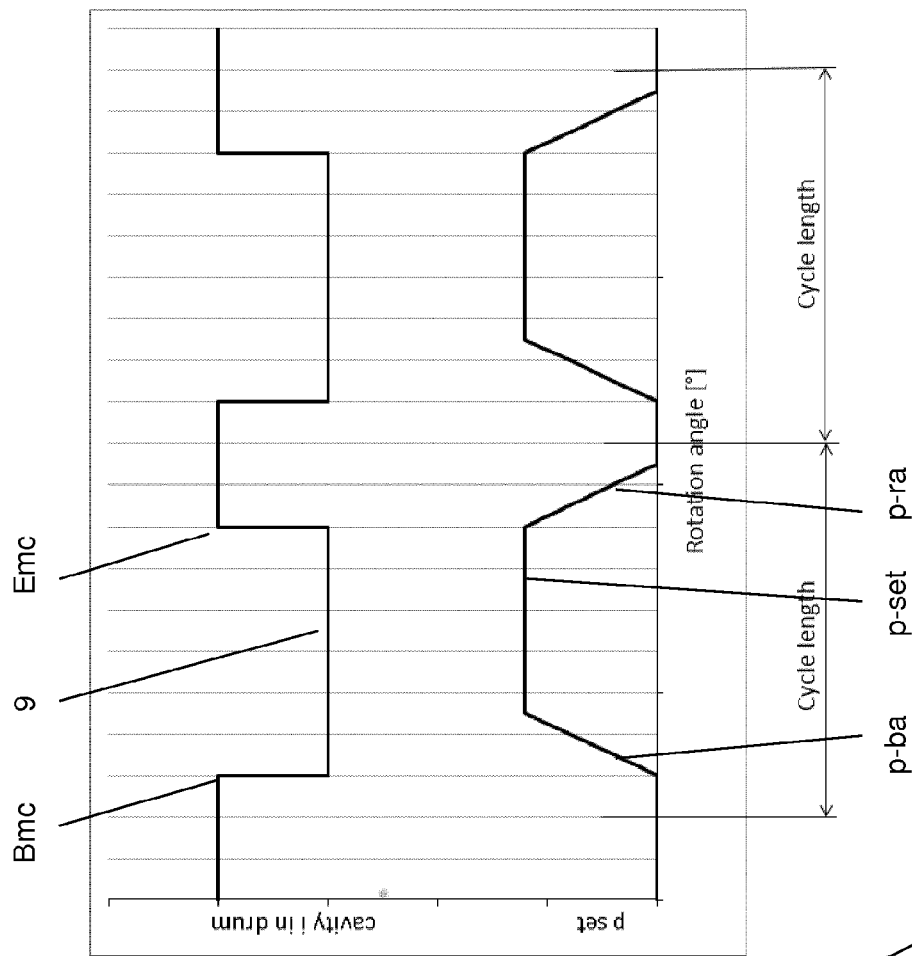
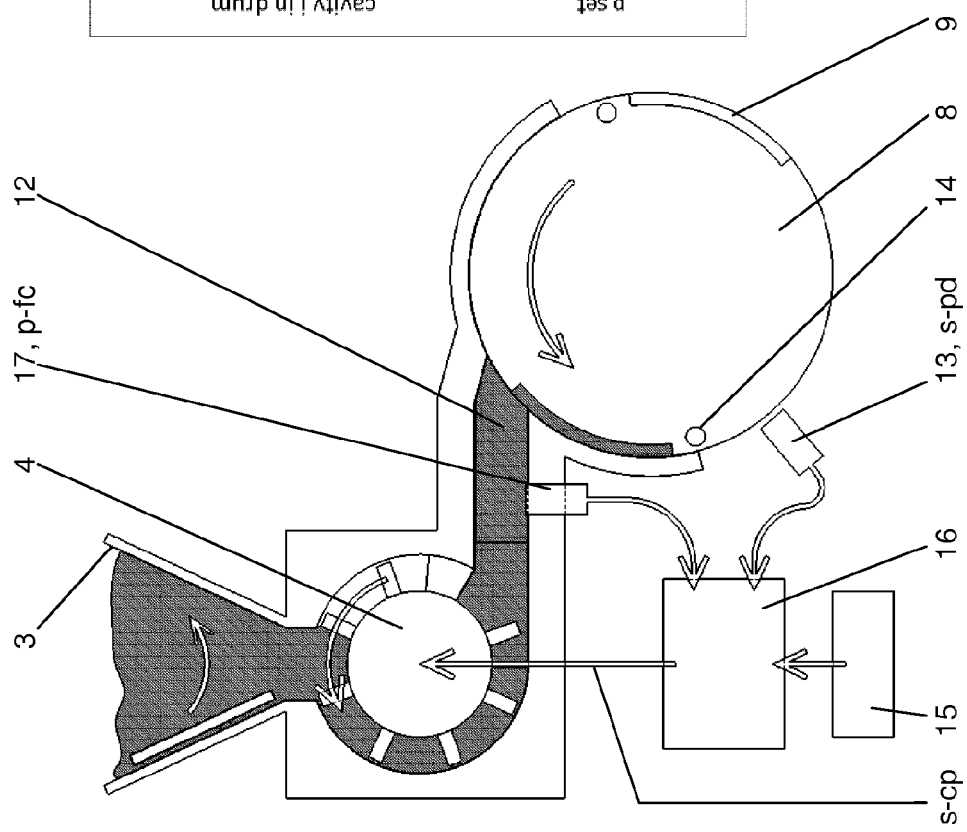
Fig. 5 c
Fig. 5 b

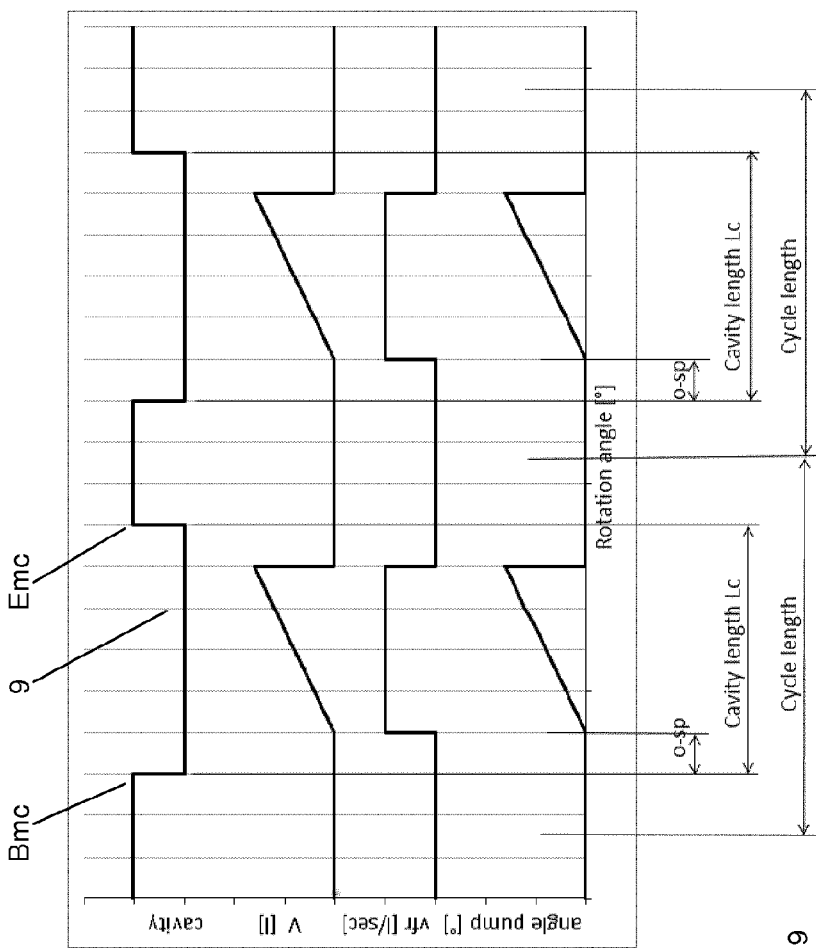
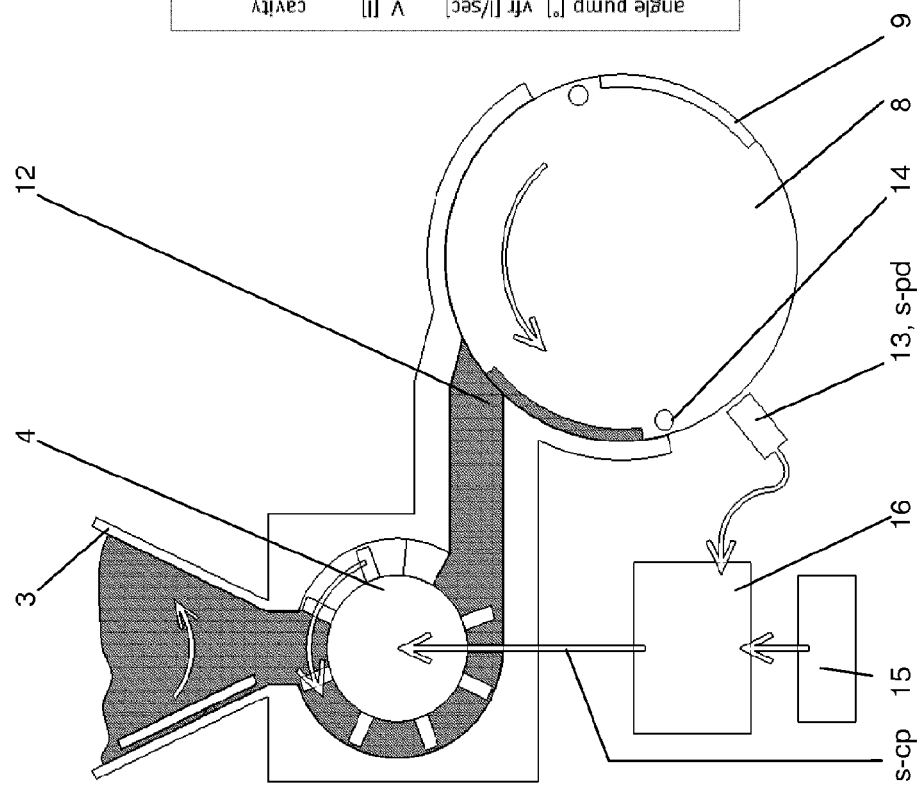
Fig. 8 a
Fig. 8 b

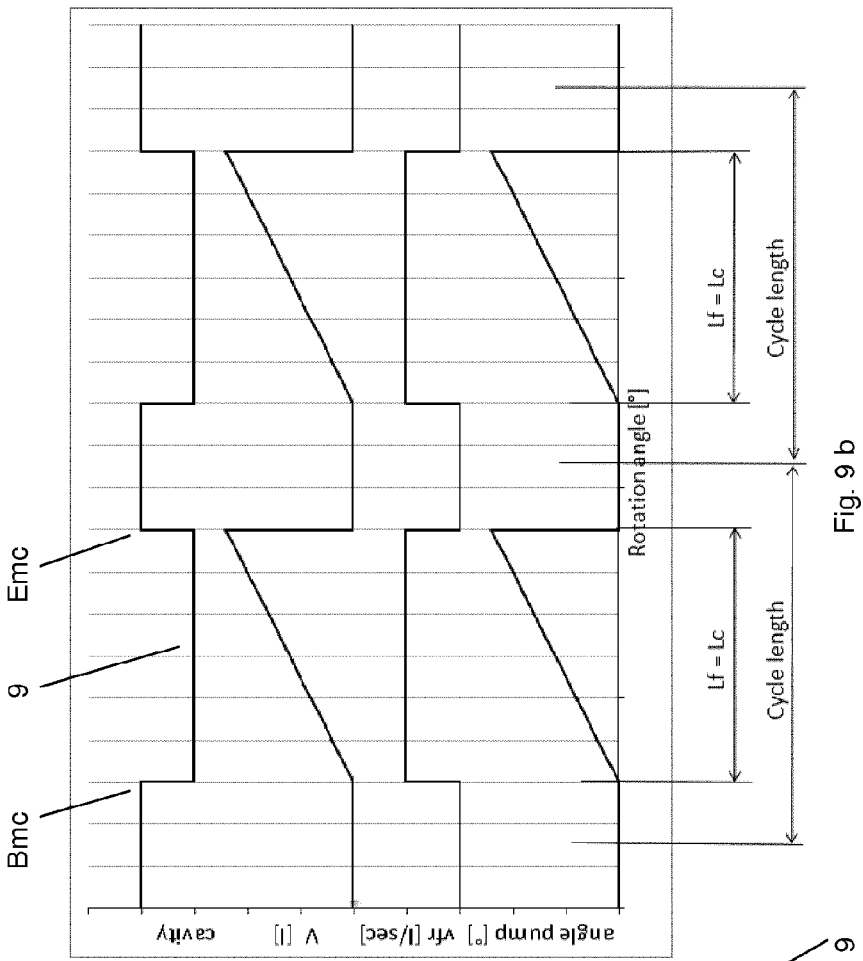
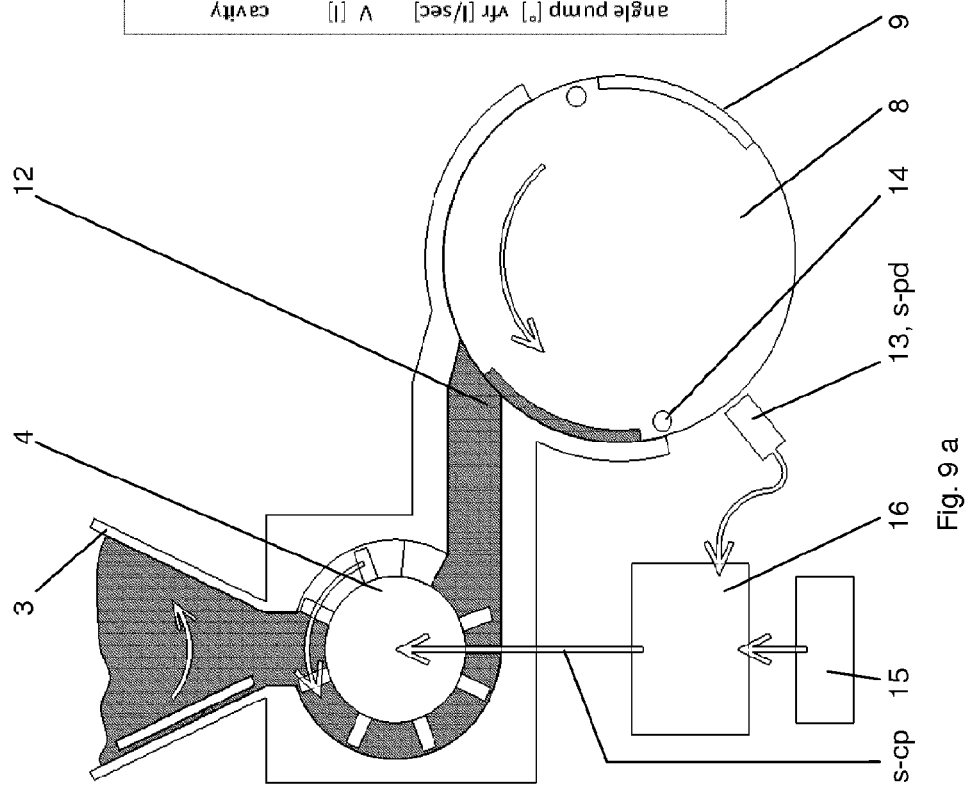
Fig. 9 a
Fig. 9 b

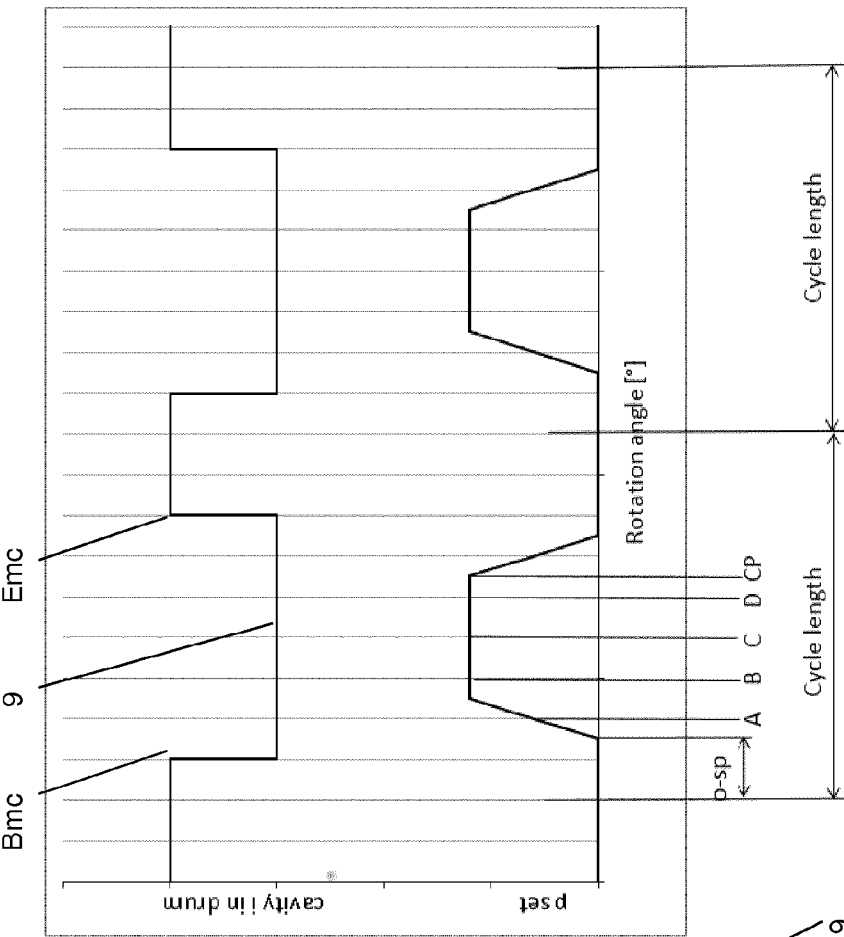
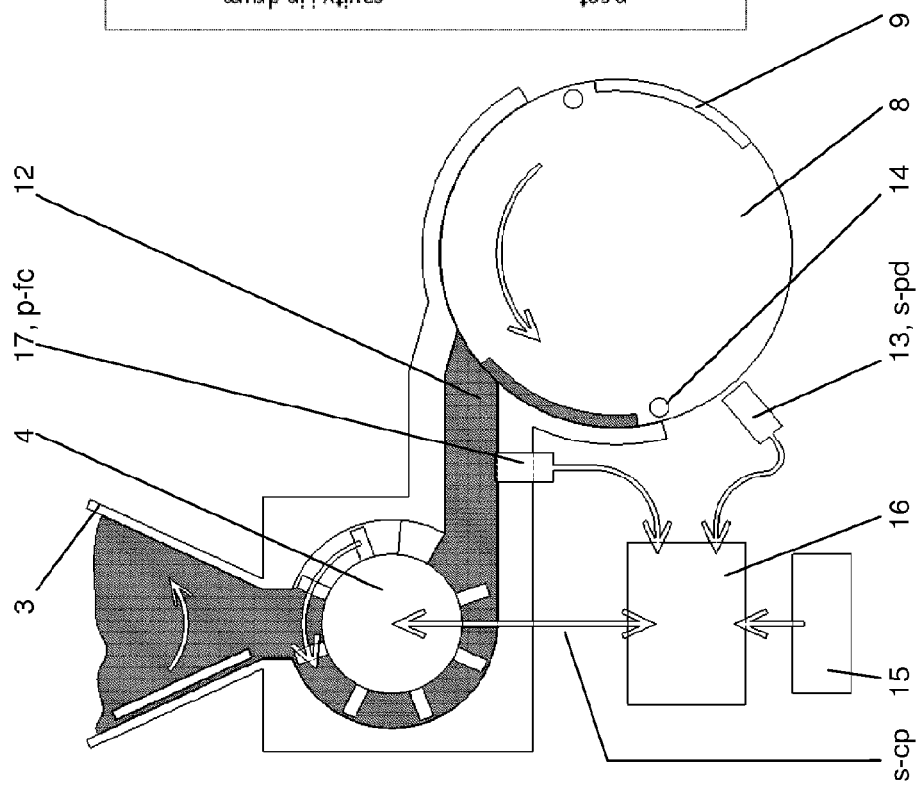

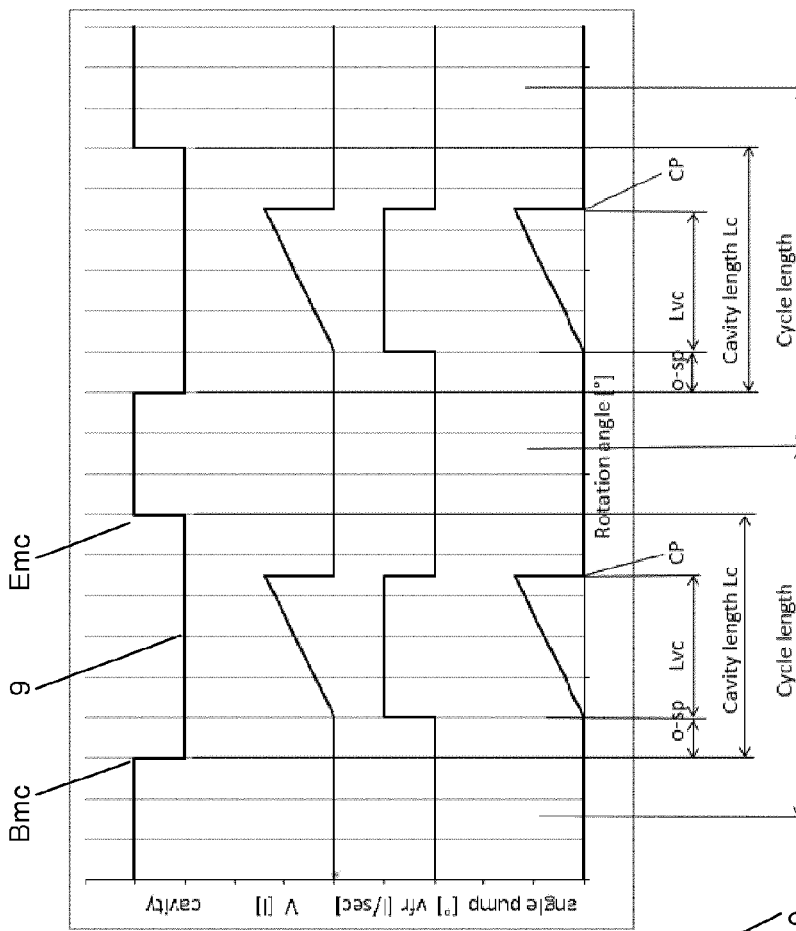
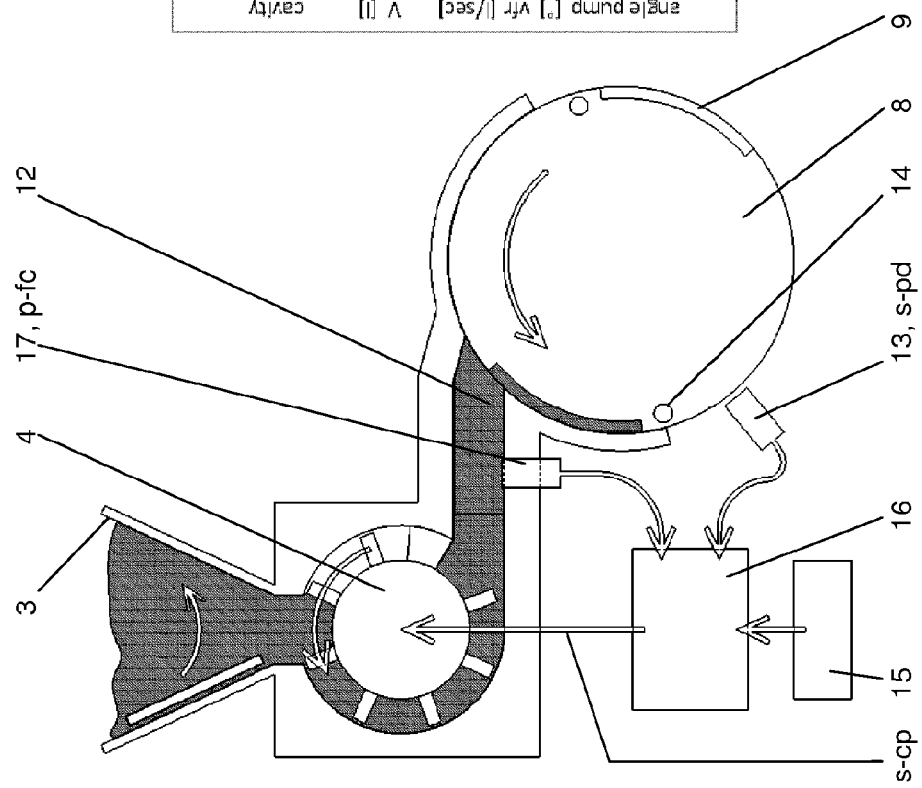
Fig. 12 a
Fig. 12 b

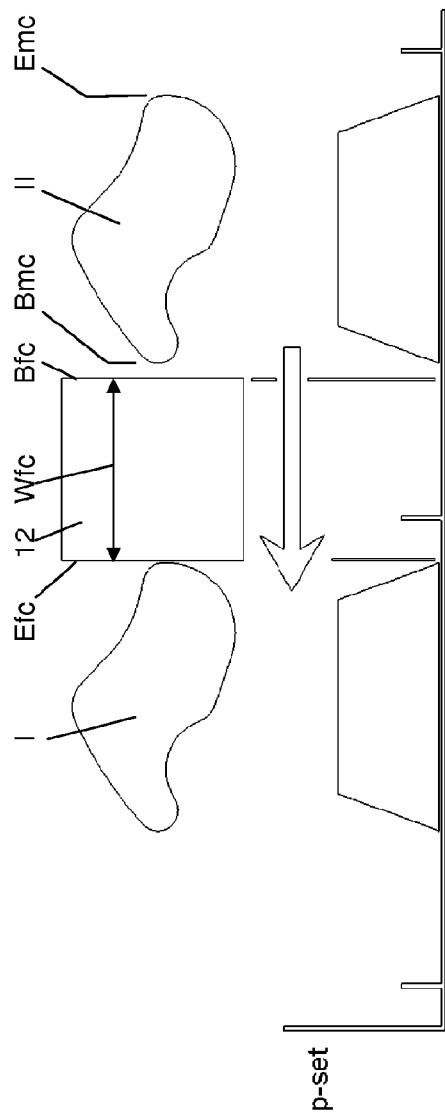
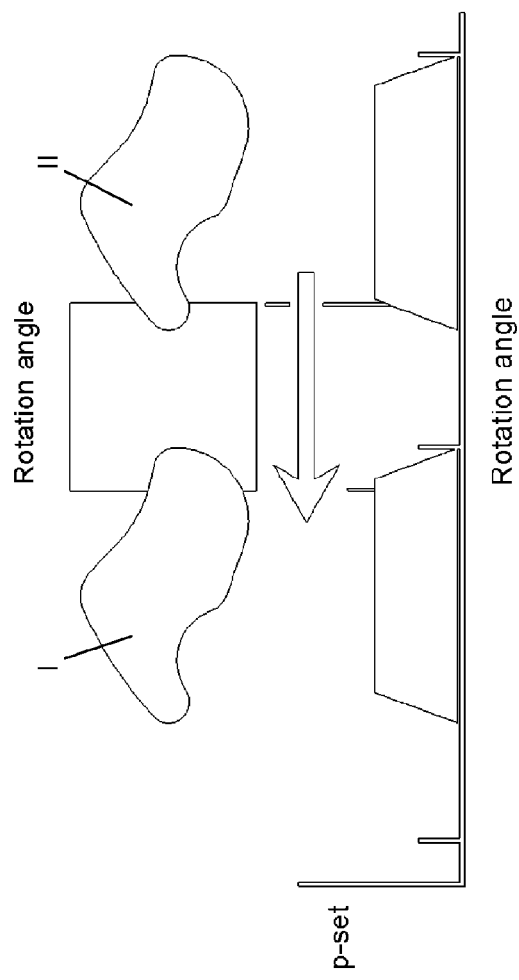
Fig. 15 a
Fig. 15 b

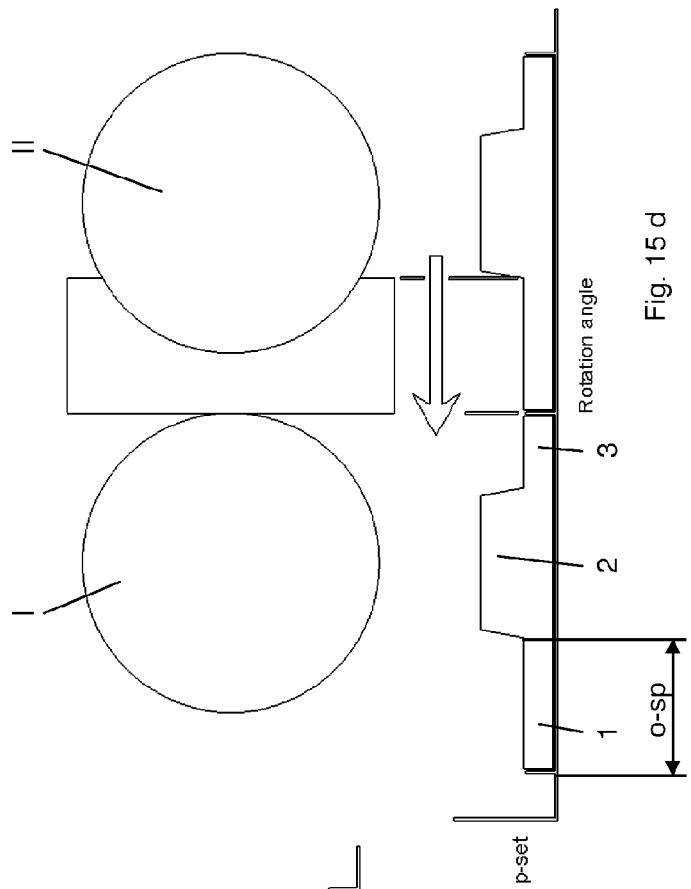
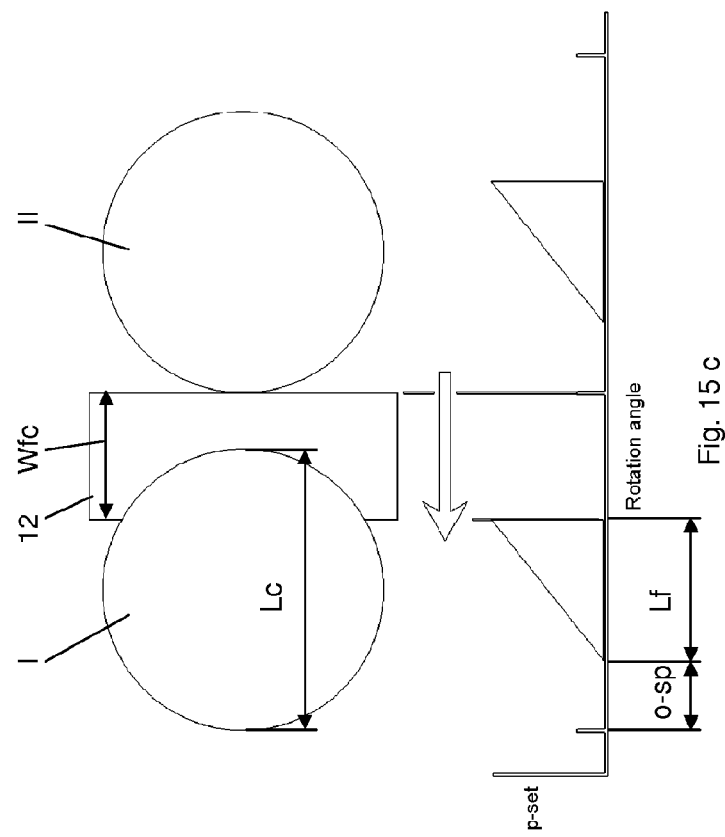

METHODS FOR FILLING CAVITIES IN A MOULD MEMBER

This invention relates to a method for moulding products from a mass of food stuff, comprising:
- moving a mould cavity, which is part of a mould member past a feed channel which fills the mass into the cavity, wherein the feed channel is connected to a feed pump which pumps the mass through the feed channel into the cavities.
- determining and/or detecting the position of the mould cavity relative to the feed channel,
- controlling the desired set pressure of the pump.

This method is well known from the state of the art and can be utilized to fill cavities in a mould member, which mould member will be used to form food articles, for example out of meat, fish, potatoes or vegetables. This mould member can be a plate, which reciprocates linearly between two positions, or a rotating drum. The mould member comprises a multitude of mould cavities which cavities can be arranged in rows which can extend perpendicular to the direction of motion of the mould member, particularly parallel to the axis of rotation of the drum. In case the mould member is a drum, it consists in a preferred embodiment out of a stainless steel tube shaped element. To this tube shaped element ribs can be applied which ribs provide rows in longitudinal direction of the drum. Elements of porous material, for example made from sintered stainless steel, can be positioned between the ribs. Every row should be provided with fluid passages which extend in longitudinal direction of the drum and which are located between the outer diameter of the tube shape element and the porous structure. During the filling of cavities, air entrapped in the cavities can escape via the walls of the cavities and the surrounding porous structure and via the passages out of the drum. During the discharge of formed products fluid will flow via a pressure source through the passage and through the porous structure to the cavities. This flow of fluid will eliminate the adhesion forces between the formed product and the cavity walls with result that the formed product will be discharged on for example a belt. To prevent that during discharge of formed products out of the cavities the fluid will flow to adjacent rows, reference can be made to WO 2012107236 wherein drum designs and fluid flow through a mould drum are described.

Reference can also be made to WO 2013107815 wherein a mass supply system and a process is described which can be used together with a mould member. In one of the embodiments in this patent application the use and design of a positive displacement feed pump is described and also a pressure control system to equalize the pressure over the width of the pump, divider and drum to achieve the same product weight of all formed products in longitudinal direction of the drum.

This application describes further a pressure controlled filling of cavities in a mould member and also a volume controlled filling. The control unit can for example be provided with intelligence to adjust the filling of a next row of cavities if a previous row is not entirely filled.

It is the objective of the present invention to improve the method for moulding products from a food mass known from the state of the art.

This objective is achieved with a Method for moulding products from a mass of food stuff, comprising:
- moving a mould cavity, which is part of a mould member past a feed channel which fills the mass into the cavity, wherein the feed channel is connected to a feed pump which pumps the mass through the feed channel into the cavities.
- determining and/or detecting the position of the mould cavity relative to the feed channel,
- controlling the pressure of the pump according to a desired set pressure, wherein the desired set pressure is increased to fill the cavity with the mass and then decreased while or after the cavity has been filled based on the position of the mould cavity relative to the feed channel.

The inventive method allows to maintain the quality and structure of products such as fish which are delicate and which structure can easily be damaged. Due to the pressure control, changes in pressure can be gradual and excessive pressures and unnecessary pressing moments are avoided. Further advantages of the inventive method is a low filling pressure, i.e. the pressure to which the food mass is subjected during filling which results in a low pressure between the seal plate and the mould member for example a drum and between a cutting member and the drum with the result of less bending of the drum, less leakage of the food mass between seal plate and drum and increased lifetime of seal plate and cutting member.

The disclosure made for this embodiment of the present invention also applies to and can be connected with the other embodiments of the present invention and vice versa.

The present invention is based to a system with a feed pump, preferably a positive displacement pump, and a mould member, preferably a rotating mould drum, comprising cavities. The feed pump is preferably but not limited to a positive displacement pump with a rotor. The feed pump pumps the food mass from a hopper into the cavities of the mould member in which the food mass is formed into the resulting food product, for example the patty.

The system can be utilized for processing meat, fish, potatoes and vegetables like spinach. Particularly, the system can be utilized to execute the inventive method. The inventive method is especially suitable for processing delicate and easily damaged products such as high-quality whole muscle meat products. Preferably, the mould member is a drum which rotates from a filling position in which its cavities are filled with the food mass to a discharge position in which the formed products are removed from the cavities.

The mould member, preferably the mould drum, comprises mould cavities to form the products, which preferably are at least partially made from a porous material, for example made from a sintered metal material. Each porous cavity is connected to a fluid passage, which more preferably extends in the longitudinal direction of the drum. During rotation of the drum from the discharge position to the fill position the cavities can preferably be filled with air. During filling of product in the product cavities, this air within the cavities will preferably be discharged through the porous walls of the at least partially porous cavities.

Additionally or alternatively, gas in the product, for example air, can be removed from the product through the porous material and via the fluid passage, for example to the ambient.

According to the present invention, the position of the mould cavity relative to the feed channel is determined and/or detected. This can be, for example be carried out by a sensor.

Furthermore, the pressure of the pump according to a desired set pressure is controlled, wherein the desired set pressure is increased to fill the cavity with the mass and then decreased while or after the cavity has been filled based on the position of the mould cavity relative to the feed channel.

Due to the reduced pressure after the filling of the respective cavity or a row of cavities is completed, damage of the food mass is at least reduced. Since the pressure and not the delivered volume is controlled, it is assured that each cavity is filled completely.

Preferably, the desired set pressure is increased and or decreased according to a ramp. Due to this gradual increase in pressure on the food mass, damage of the food mass is at least decreased.

In yet another preferred embodiment of the present invention, the desired set pressure is decreased to zero after the filling of a cavity. Alternatively, the desired set pressure is maintained above zero after filling of a cavity.

Another subject matter of the present invention is a method for moulding products from a mass of food stuff, comprising:
  moving a mould cavity, which is part of a mould member past a feed channel which fills the mass into the cavity, wherein the feed channel is connected to a feed pump which pumps the mass through the feed channel into the cavities,
  determining and/or detecting the position of the mould cavity relative to the feed channel,
  controlling of the pump
  wherein the volumetric flow rate is controlled during the filling of a mould cavity.

The disclosure made for this embodiment of the present invention also applies to and can be connected with the other embodiments of the present invention and vice versa.

According to this embodiment of the present invention, the volumetric flow rate, i.e. volume, for example liter of food mass per time unit, for example second, discharged into the cavity to be filled is controlled during the filling of each cavity and/or during the filling of one row of cavities. The volumetric flow rate can be measured, for example, with a sensor, e.g. a flow meter. The signal of this sensor is transferred to a control unit which controls the feed pump, for example its speed of rotation. Alternatively, a sensor, for example a camera could observe the degree of filling of a mould cavity and send its signal to the control unit which controls the feed pump. Alternatively, the profile of the volumetric flow rate during the filling of one cavity can be a predetermined curve.

Preferably, the volumetric flow rate is not constant during the filling of a mould cavity. More preferably the volumetric flow rate changes with the extension of the mould cavity perpendicular to direction of motion of the mould member. This embodiment is preferred in case the this extension is not constant. This is for example the case during the production of round or oval shaped patties.

In a preferred embodiment of the present invention, the volumetric flow rate of the food mass is controlled based on the volume of the food mass to be delivered for one cavity and on a desired offset of the filling of a cavity.

Preferably, the already delivered volume of food mass into a mould cavity is measured at least once during filling of a cavity. Based on this measurement, the volumetric flow rate of the food mass is preferably adjusted Preferably, the volumetric flow rate of the food mass is adjusted after the mould cavity is filled to a certain percentage. The operator can set a degree up to which the respective mould cavity has to be filled. As soon as this degree is reached, the volumetric flow rate is changed, preferably decreased.

Another embodiment of the present invention is a method for moulding products from a mass of food stuff, comprising:
  moving a mould cavity, which is part of a mould member past a feed channel which fills the mass into the cavity, wherein the feed channel is connected to a feed pump which pumps the mass through the feed channel into the cavities.
  determining and/or detecting the position of the mould cavity relative to the feed channel,
  controlling of the pump
  wherein the pressure of the pump and/or the volumetric flow rate is automatically adjusted to the speed of movement of the mould member.

The disclosure made for this embodiment of the present invention also applies to and can be connected with the other embodiments of the present invention and vice versa.

This embodiment of the present invention has the advantage that only the speed of the movement of the mould member, particularly the speed of rotation of a mould drum has to be set by an operator. The filling cycle then adapts automatically.

Preferably, the desired set pressure in relation to the motion of the mould member is chosen such that the distance covered by a mould cavity during filling is equal or longer than the length of mould cavity in the direction of the motion of the mould member.

This preferred embodiment of the present invention has the advantage that the filling of the mould cavities can be carried out very gentle.

Another embodiment of the present invention is a method for moulding products from a mass of food stuff preferably according to one of the preceding claims, comprising:
  moving adjacent rows of mould cavities, which are part of a mould member, past a feed channel which fills the food mass into the cavities, wherein the feed channel is connected to a feed pump which pumps the mass through the feed channel into the cavities,
  wherein the width of the feed channel is larger than the distance between two rows of mould cavities so that the feed channel may be in fluid communication with two mould cavities in two separate rows simultaneously,
  controlling the pump so that the set pressure exerted on the food mass is varied during the filling of the respective mould cavity and/or varied after the completion of the filling of one mould cavity,
wherein during overlap of the feed channel with two adjacent rows of cavities, the set pressure profile for is identical for both mould cavities.

Preferably, the set pressure for filling the mould cavities is increased, after the overlap is terminated.

Preferably, the set pressure is maintained at a constant value during the overlap of two rows of cavities with the feed channel. This constant pressure can be zero bar or above zero bar.

Another preferred or inventive embodiment of the present invention is a method for moulding products from a mass of food stuff, comprising:
  moving adjacent rows of mould cavities, which are part of a mould member past a feed channel which fills the food mass into the cavities, wherein the feed channel is connected to a feed pump which pumps the mass through the feed channel into the cavities,
  wherein the width of the feed channel is such that the feed channel may be in fluid communication with two mould cavities in two separate rows simultaneously, controlling the pump so that the volume flow rate of the food mass is varied during the filling of the respective mould cavity and/or varied after the completion of the filling of one mould cavity,
wherein, during overlap of the feed channel with two adjacent rows of cavities, the volume flow rate is identical for both mould cavities.

The disclosure made for this embodiment of the present invention also applies to and can be connected with the other embodiments of the present invention and vice versa.

Preferably, the volume flow rate is increased after the overlap is terminated.

Another preferred or inventive embodiment of the present invention is a method for moulding products from a mass of food stuff, comprising:
moving a mould cavity, which is part of a mould member past a feed channel which fills the mass into the cavity, wherein the feed channel is connected to a feed pump which pumps the mass through the feed channel into the cavities.
determining and/or detecting the position of the mould cavity relative to the feed channel,
controlling of the pump
wherein the filling of the cavities is partially carried out by controlling the pressure of the pump and partially by controlling the displaced volume of the pump and/or the flow rate of the pump.

The disclosure made for this embodiment of the present invention also applies to and can be connected with the other embodiments of the present invention and vice versa.

Preferably, each cavity is firstly filled by controlling the displaced volume of the pump and/or the flow rate of the pump and then by controlling the pressure of the pump.

The inventions are now explained according to FIGS. 1-16. The explanations do not limit the scope of protection of the present application. The explanations apply to all inventions, respectively.

FIGS. 5a-7d show embodiments of a first inventive method.

FIGS. 8a-12b show embodiments of a second inventive method.

Figure 1:
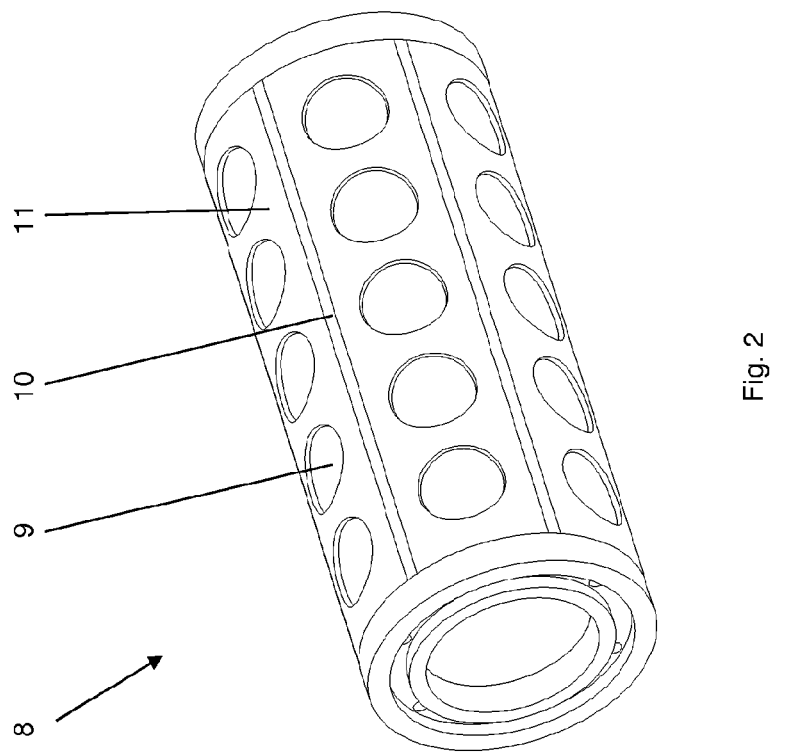
FIG. 1 shows a food forming apparatus in combination with a mass supply system.

FIG. 1 shows a mass supply system 2 comprising a pump system 4 and a hopper 3 and which is connected via mass transfer means 5 and divider 6 to a forming apparatus 1. The forming apparatus is here provided with a mould drum 8. Seal 7 will be used to reduce/prevent leakage of food mass to the ambient. The mould drum rotates around an axis and is filled in a filling position with a food mass which is pressed into the cavities 9. In a discharge position, the formed products are discharged, here on a transportation belt. The person skilled in the art understands that the mould member can also be a reciprocating mould plate.

Figure 2:
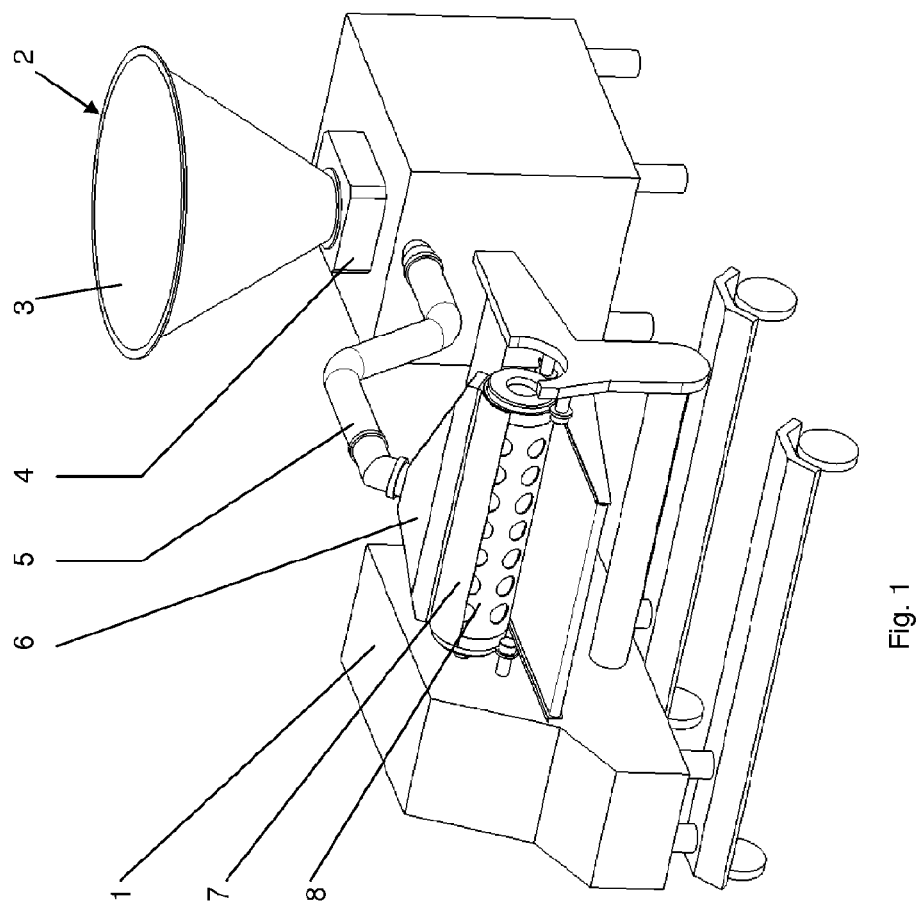
FIG. 2 shows a rotating drum as the mould member.

In case the mould member is a rotating drum, it can be designed as shown in FIG. 2. In this embodiment a porous structure 11 is applied between ribs 10 and mould cavities 9 are provided within the porous structure. This porous structure can be vented during filling of the cavities and can be utilized to discharge the formed products out of the mould cavities with compressed gas. The drum has six rows of cavities, each row having five cavities 9, which are normally filled in parallel and all cavities in one row are controlled according to the same control-scheme.

Figure 3:
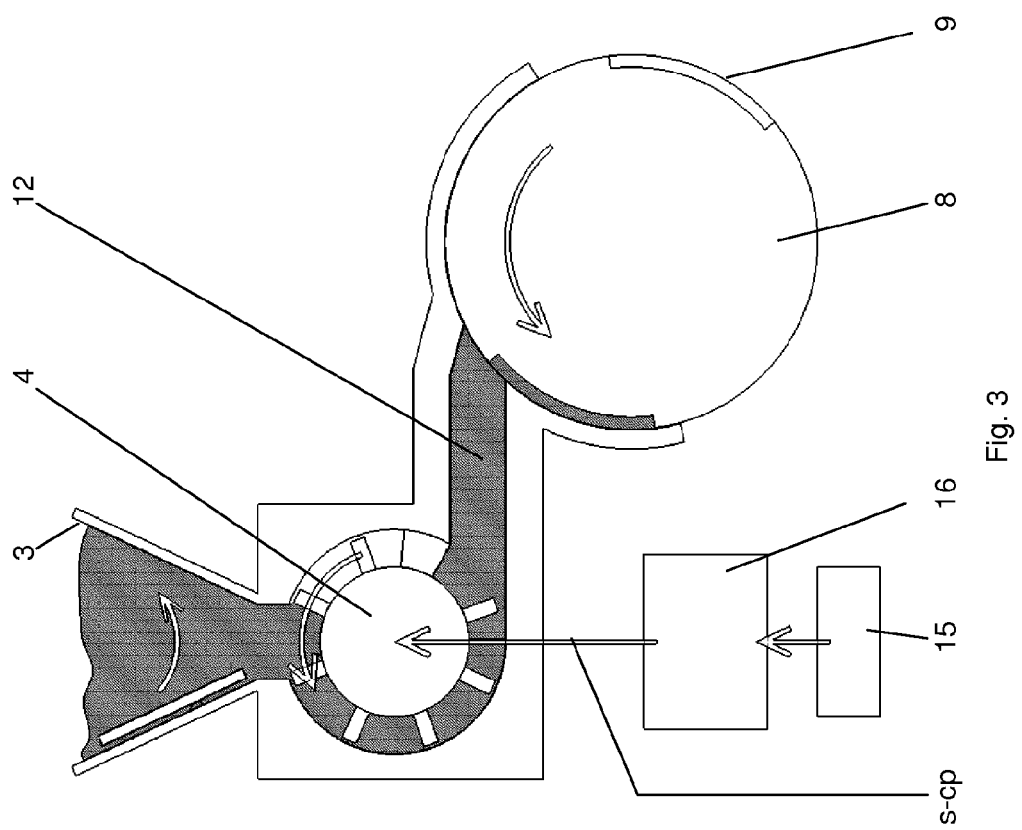
FIGS. 3 and 4 shows a filling scheme according to the state of the art.

FIG. 3 shows a not controlled system to fill cavities in a drum as the mould member. This system is a generally known and used molding system. Feed pump 4 pumps the food mass from a hopper 3 and via a feed channel 12 into the cavities 9 of mould drum 8. The only set value, which is a setting in input source 15 and/or control unit 16, is the rotational speed of the pump sDP.

This system can be monitored such that a pressure exerted on the mass will not exceed a pre-set maximum allowable pressure. Such a monitoring system can be used in all embodiments in this application.

Figure 4:
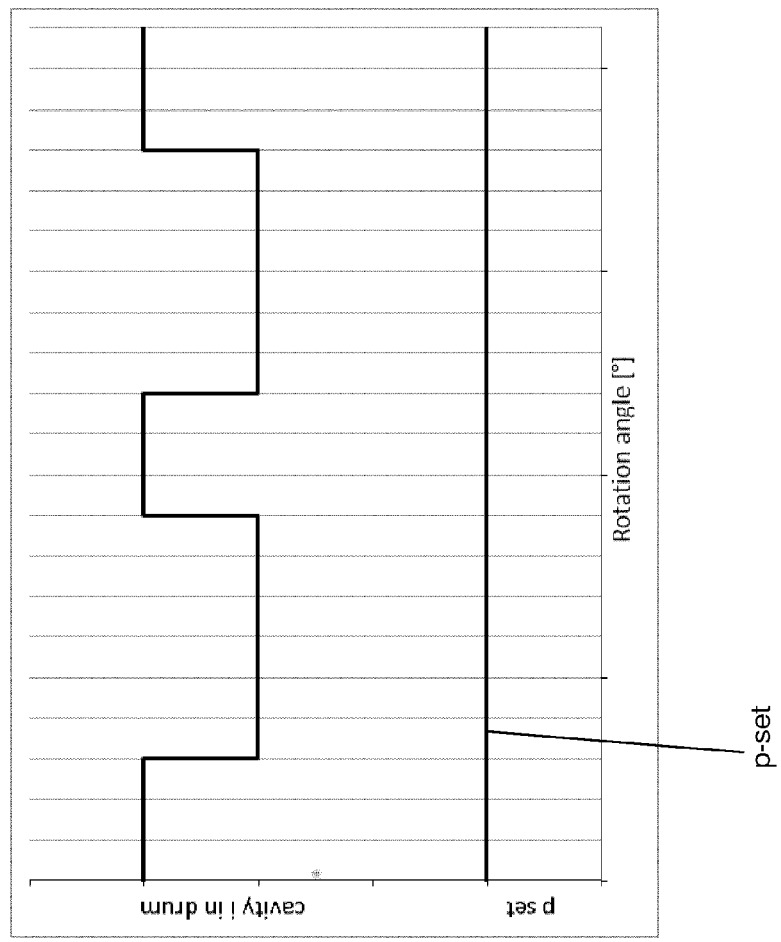
Figure 4:
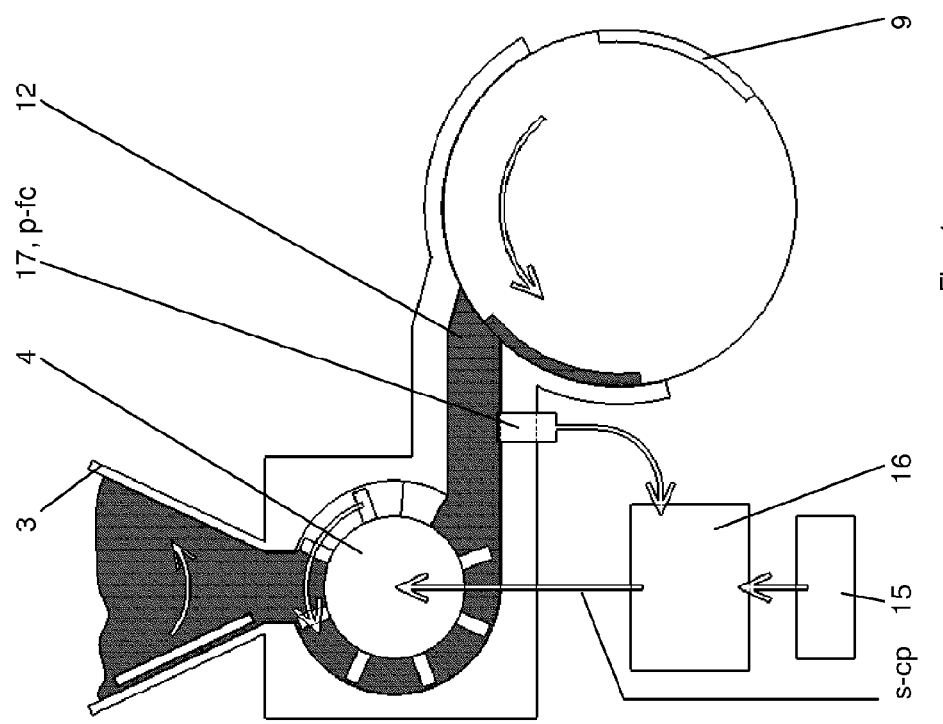

FIG. 4a shows a pressure controlled system. Therefore pressure measuring means 17, for example a sensor, are positioned in the feed channel to measure the actual pressure p-fc of the mass.

FIG. 4b shows a graph with desired pressure profile p-set versus the rotation angle (rotational displacement) of the mould member, here a drum. The control system in this embodiment is well known in the field to fill food stuff material in cavities in as well a drum type mould member as a plate type mould member. P-set is a set desired pressure inputted into input source 15 and/or control unit 16, and represents the desired pressure with which the cavities should be filled. The set pressure is constant regardless whether a cavity is in contact with the feed channel 12 or not. P-set is the desired pressure in the feed channel, preferably relatively close to the outlet of the feed channel.

During production the control unit 16 compares actual pressure p-fc with desired pressure p-set. As soon as a cavity comes in communication with the feed channel, mass will flow into the cavity and pressure p-fc will drop below p-set. The control unit will respond and will send signal s-cp to the feed pump with the result that the pressure on the mass will be increased. When p-fc exceeds p-set the pump will stop. Another input value at the input source 15 and/or control unit 16 is the speed of the pump sDP.

Further, depending on the controller and type of control loop that will be used, the P, I and/or D settings can be input parameters to determine the response as soon as a deviation from the set pressure p-set will occur. To ease operation of the forming apparatus the P, I and D settings can also be machine settings and will in that case be changed only occasionally.

The speed of the pump sDP and the P, I and D settings can be input parameters in all described pressure controlled systems in this document.

FIG. 5a-5c showing a more sophisticated pressure control system. Drum 8 in FIG. 5a is provided with 6 rows each with a multitude of mould cavities. Each cavity is characterized by Bmc (begin mould cavity), Emc (end mould cavity) and Lc (length of a mould cavity in circumferential direction of the drum). The feed channel 12 is characterized by Bfc (begin feed channel), Efc (end feed channel) and Wfc (width of the feed channel in circumferential direction drum). The width of the feed channel covers the entire length of the drum in axial direction.

The mould system comprises a sensor which is connected to a control unit so that the control unit knows the position of the cavities with respect to the position of the feed channel. Hence, every row of cavities will be filled the same way to prevent weight differences and shape distortion of formed products independent in which row of the drum the products are formed. Therefore detection means 13, with which the position of the cavities and/or the drum can be determined versus the position of the feed channel, are provided. Depending on the chosen detection means one or more (for example for every row) cavity and/or drum position means 14 will be used too.

The pressure in feed channel 12 will preferably be controlled to a value which is in accordance with the desired pressure p-set at that part of the drum which is at that moment in line with the beginning of the feed channel Bfc. I.e. in the embodiment of FIG. 5a the pressure in feed channel 12 is zero bar as long as no filling takes place and will be increased as soon as Bmc (begin of cavity 9) passes Bfc (begin of feed channel). As a result of the pressure difference between feed channel 12 and empty cavity 9, mass will flow from the feed channel into the cavity. As soon as the end of the cavity Emc has passed the beginning of feed channel Bfc, the set pressure will be reduced to zero again. The same control scheme is executed for the next row of cavities.

FIG. 5b shows that control unit 16 receives a signal p-fc (actual pressure in the feed channel) and a signal s-pd (signal actual position cavities and/or drum). Further it receives the desired pressure profile p-set versus the rotational angle of the drum, see FIG. 5c. This pressure profile includes parameters p (pressure level), p-ba (pressure build-up angle to determine the ramp-up of the pressure) and p-ra (pressure reduction angle to determine the ramp-down of the pressure) and is related to the dimension of cavity 9 to be filled. The cycle length is defined as the rotational angle of the drum which corresponds with one row of cavities.

Within the system all kind of delays can occur, see FIG. 5b; response time of the pressure measuring means 17, response time of the detection means 13, response time PLC/control unit 16, inertia of the volume of mass between pump and drum, compressibility of the used mass, inertia of response time pump, etc. Preferably control unit 16 will take these delays into account and will calculate signal s-cp based on the set pressure p-set versus rotation angle of the drum in combination with the expected delays to control the pump accordingly.

Depending on the used detection means 13 and drum position points 14, the control unit needs additional information such as the diameter of the drum, the number of rows in the drum, the circumferential position of the cavities in the drum and, depending on the embodiment, the length of a cavity Lc. The speed of rotation of the drum sMM can be calculated within the control unit based on signal s-pd or can be an input parameter. This applies to all further described embodiments in this document where detection means 13 are used.

The filling length, i.e the rotational angle of the drum during which filling shall take place is not an input parameter in the present control scheme, but is for example dependent on p-set, the viscosity of the food mass and/or the rotational speed of the drum. It is preferred to achieve a filling length which is equal or longer than the length of the respective mould cavity in circumferential direction of the drum.

Depending mainly upon the flow characteristics of the food mass and the internal binding of the food mass other set pressures p-set versus the rotation angle of the drum (In case the mould member is a drum) and relative to the position and length of the mould cavities can be used as shown in the graphs FIGS. 6a till 6h. In all these embodiments the pump will preferably exert only pressure on the food mass in the feed channel according the chosen pressure in case filling of mould cavities shall take place. Preferably no pressure is exerted on the food mass in case no cavity is filled.

In general, in case the length of the pressure profile versus rotation of the drum is shorter than Lc, the starting point to fill a cavity will not necessarily be as soon as Bmc passes Bfc but can be advanced or delayed with offset parameter o-sp. The same is true in case the length of the pressure profile is equal to Lc but shorter than Lc+Wfc. The longest possible length of the pressure profile is the length of cavity Lc added to the width Wfc of feed channel 12.

FIG. 6d shows that the starting point of the exertion of pressure on the mass in the feed channel versus the angle of rotation of the drum is delayed in relation to the begin of mould cavity Bmc due to an offset parameter o-sp≠zero. This is a typical pressure profile in case mass will be processed with a good flow characteristic and hence the time to fill the cavity is relatively short. As soon as the flow of mass has stopped the pressure on the mass in the feed channel can be reduced and/or adjusted to zero bar.

FIG. 6g shows that the starting point of the pressure on the mass in the feed channel versus the angle of rotation of the drum is advanced in relation to the begin of mould cavity Bmc. This is a typical pressure profile in case a mass will be processed with a poor flow characteristic, so that the time to fill the cavity will be relatively long.

FIG. 6c shows that the stop point o-ep of the pressure on the mass in the feed channel versus the angle of rotation of the drum is advanced relative to the end of mould cavity Emc. This is a typical pressure profile in case a mass will be processed with comparatively little internal binding (cohesion). There is no need to keep pressure on the mass till the end of the filled cavity Emc has entirely passed the beginning of feed channel Bfc.

FIG. 6h shows that the stop point o-ep of the pressure on the mass in the feed channel versus the angle of rotation of the drum is delayed relative to the end of mould cavity Emc. This is a typical pressure profile in case a mass will be processed with internal binding (cohesion) typical for example for a fibrous product. Pressure has to remain on the mass preferably until the end of the filled cavity Emc has entirely passed the end of feed channel Efc. This will prevent so called backflow, a flow of food mass from the filled cavity back to the feed channel.

In FIG. 6i is an embodiment showed with multiple pressure levels versus the rotation angle of the drum. FIGS. 6j and 6k show the influence of the set pressure p-set versus the filling time of a cavity. In both Figures the cavity will be entirely filled, in FIG. 6j the filling time has to be short and hence a high pressure is needed. In FIG. 6k the mass has more time to flow into the cavities and hence the pressure will be relatively low.

FIG. 7a shows a set pressure p-set versus the rotation angle of the drum wherein a permanent pressure is exerting on the mass in the feed channel.

Reference can be made for example to U.S. Pat. No. 4,356,595 where the mould member is a mould plate which is reciprocating between a filling position and a discharge position. During filling the fill pressure is relatively high and this pressure will be decreased to a lower pressure as soon as the mould plate moves away from the filling position and to the discharge position. In the inward stroke of the mould plate the pressure remains low and as soon as the empty cavity approaches the filling position, the pressure will be increased again.

The pressure profile in FIG. 7a is based on the pressure profile according to FIG. 6b. The pressure represents a minimum pre-set value and a maximum pre-set value which is in this embodiment exerting on the food mass over a length corresponding to Lc, the length of the mould cavity in circumferential direction of the drum. As soon as Bmc (begin of cavity 9) passes Bfc (begin of feed channel) the pressure on the mass will be increased. As soon as end of cavity Emc passes begin of feed channel Bfc the set pressure will be reduced to the minimum pre-set value, which is in the present case not zero bar. When a cavity is not entirely filled and when it is still in contact with the feed channel, depending on the actual pressure within the cavity, further filling will take place with the minimum pre-set pressure or the mass within the cavity will relax to the minimum pre-set value. In case the cavity is entirely passed the feed channel and no flow of mass is required, the mass is still subjected to the minimum pre-set pressure which is higher than zero bar and which will exert on the closed outer surface of drum 8.

The pressure profile in FIG. 7b is based on the pressure profile according to FIG. 6h and is especially advantageous in case the rotational speed of the drum is relatively high (up to 25 revs/min) and in case time is lacking to build up the pressure from zero bar to fill a cavity and/or reduce the pressure back to zero bar after filling a cavity. A minimum pressure which is constantly available can during filling of a cavity result in a lower maximum pressure on the mass and can also be advantageous when processing mass with a risk of backflow after filling.

The pressure profile in FIG. 7c is based on the pressure profile according to FIG. 6c but compare to the embodiment according to FIG. 6c, filling of a cavity will already start as soon as begin of mould cavity Bmc passes the beginning of feed channel Bfc. Thus filling will partly take place with the minimum pre-set pressure as well as partly with the maximum pre-set pressure. In this embodiment pressure will be kept on the food mass in the cavity as long as the end of mould cavity Emc has passed the end of feed channel Efc.

In FIG. 7d the pressure on the mass is constantly increased during rotation of the drum preferably until the end of cavity Emc has passed the end of feed channel Efc. This is especially advantageous to obtain always the same pressure for all formed products regardless in which row in the drum a product is formed.

Figure 5:
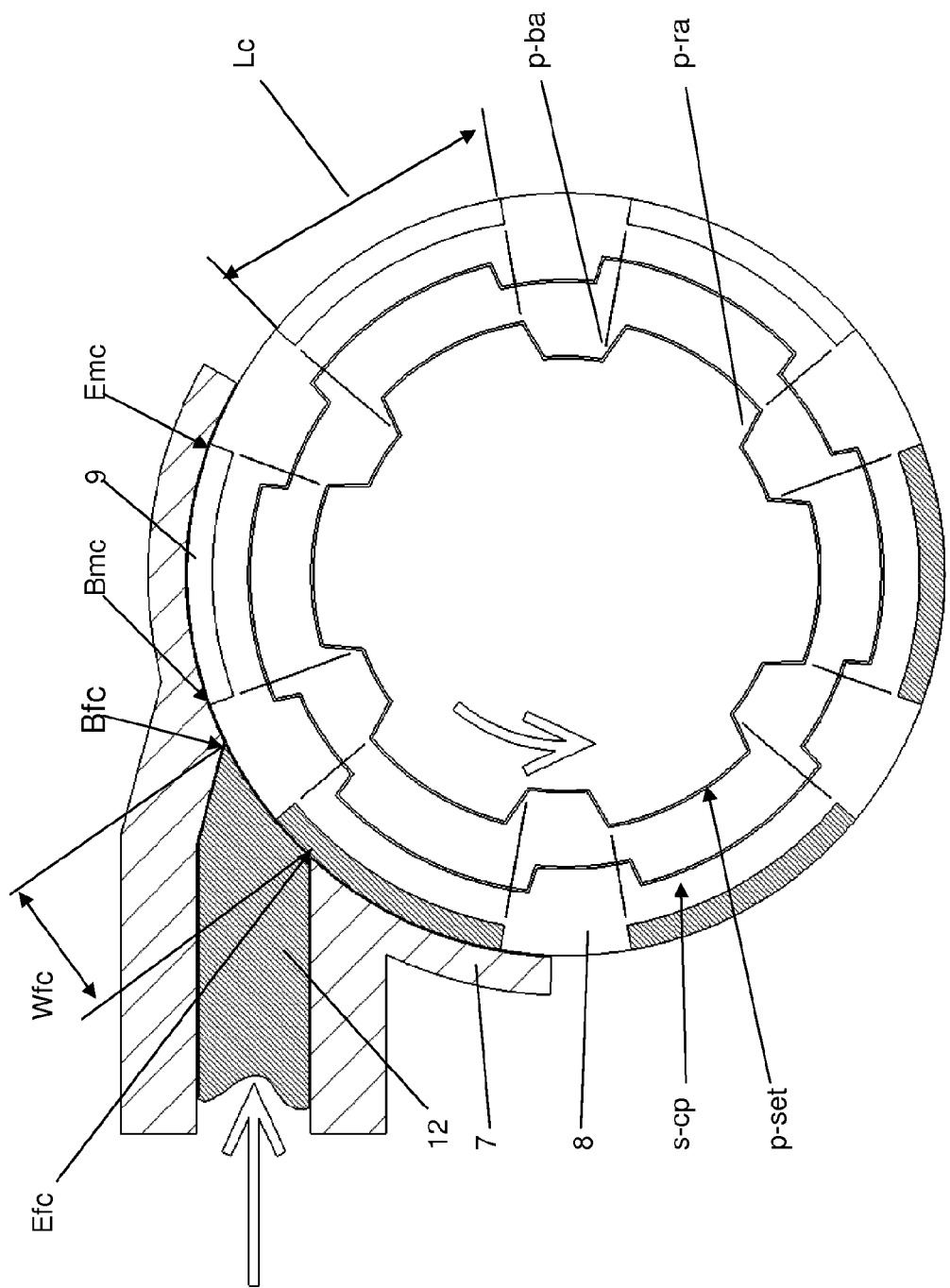
Figure 6:
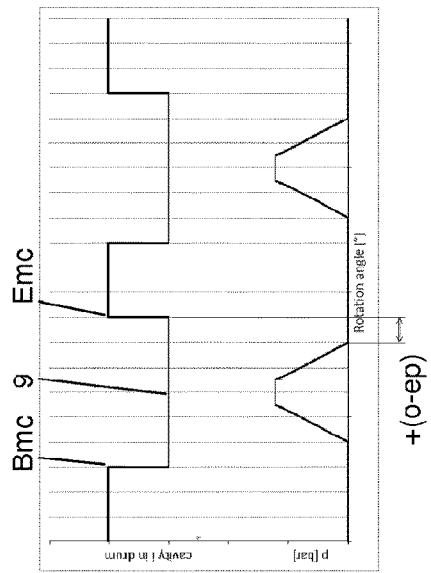
Figure 6:
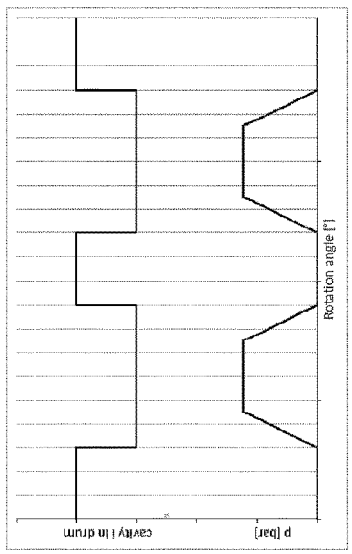
Figure 6:
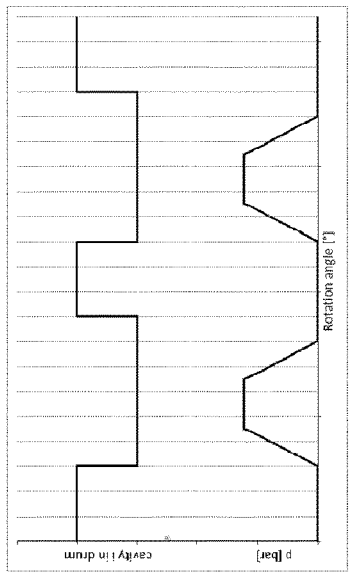
Figure 6:
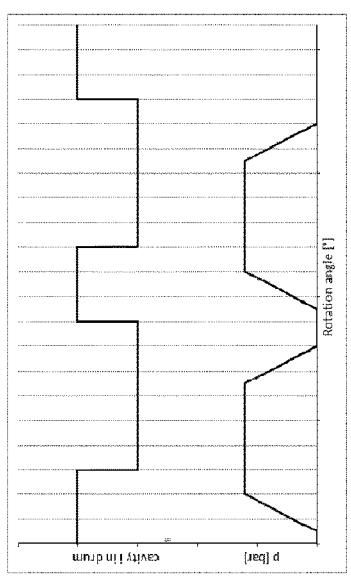
Figure 6:
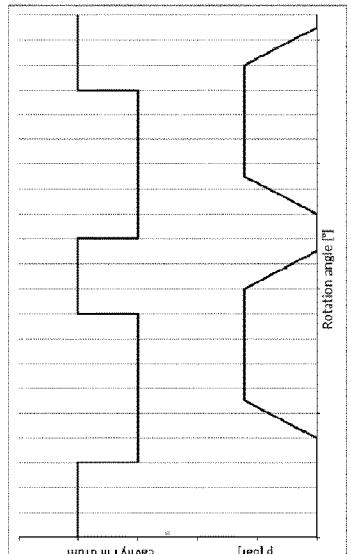
Figure 6:
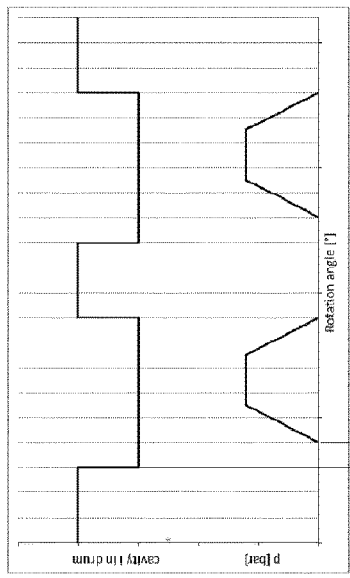
Figure 6:
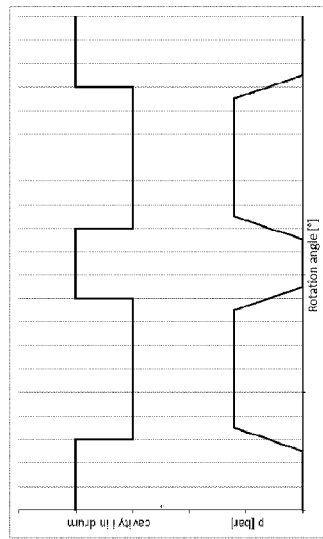
Figure 6:
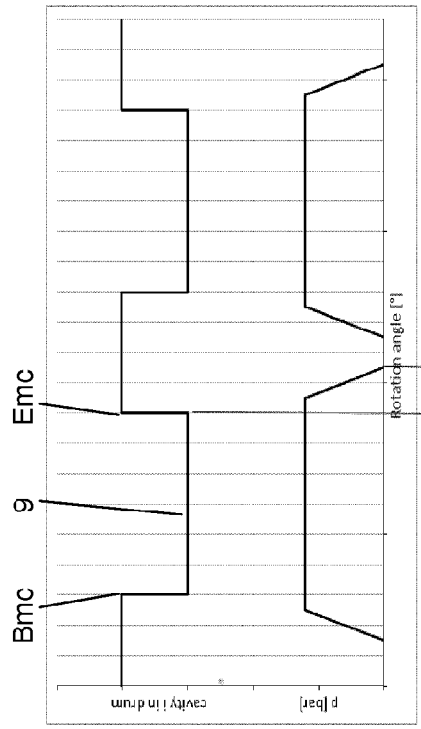
Figure 6:
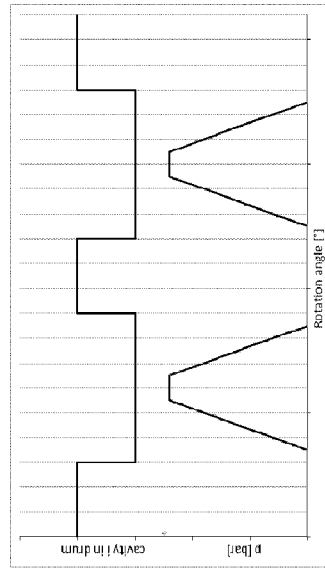
Figure 6:
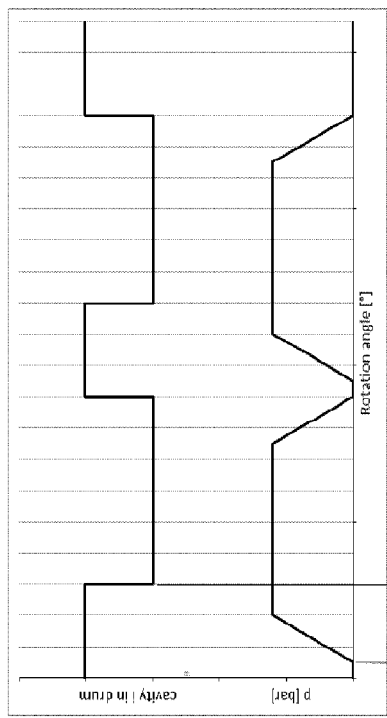
Figure 6:
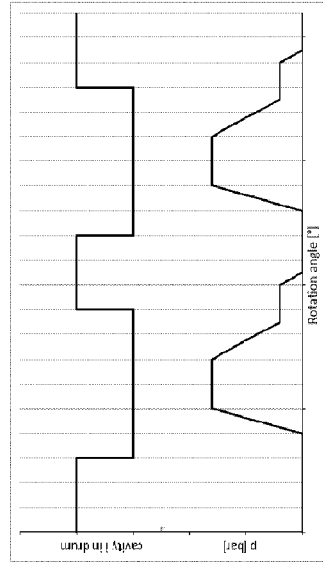
Figure 7:
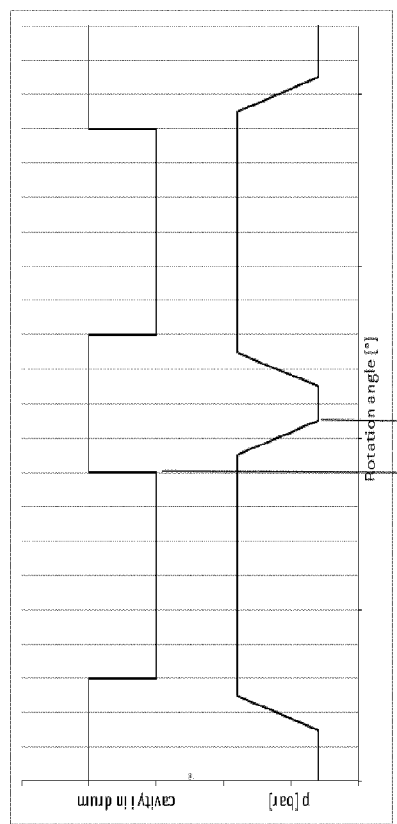
Figure 7:
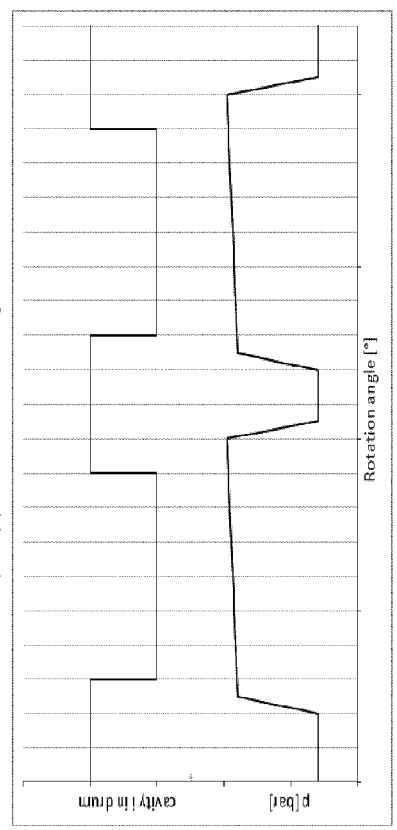
Figure 7:
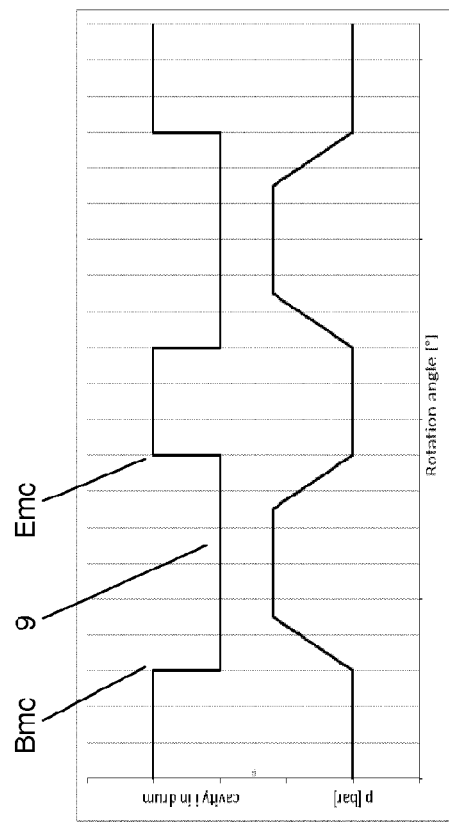
Figure 7:
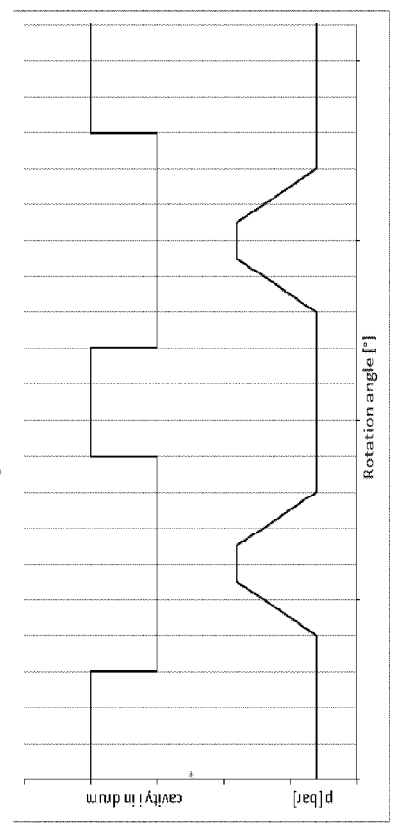

The reduction to a minimum pre-set pressure value can also be applied for the other embodiments of FIG. 5 and FIG. 6 which are not described in FIG. 7.

FIG. 8a shows a first embodiment of the invention to fill cavities with a volume controlled system. Feed pump 4 pumps a, preferably preset, volume of food mass from hopper 3 and feed channel 12 into cavities 9 of the mould drum.

The graph in FIG. 8b shows the volume profile V (volume per cycle) displaced by the pump versus the rotational angle of the drum. The delivered volume is a result of the volumetric flow rate vfr of the mass, which is a result of the rotational angle (rotation angle per cycle) of the pump, versus rotational angle of drum. The graph is based on, but not limited to a pump which rotates with a constant angular speed which results in a constant volumetric flow. The graph is further preferably based on a mass which is weakly compressible (small change in density when subject to the exerting pressure).

The cycle length is the length in circumferential direction of the drum which represents one row of cavities. FIG. 8b shows offset o-sp which determines the starting point of the volume displacement. The predetermined volumetric flow rate by which the volume will be displaced will determine the time duration of filling the cavity.

Detection means 13 are provided to preferably determine the position of the cavities and/or the drum relative to the position of the feed channel.

The volume of the cavities in one row v-or (or the volume of one cavity v-oc times the number of cavities nr-c in one row), the starting point o-sp and the speed of the pump sDP are potential parameters to be inputted into input source 15 and/or the control unit 16. In case the volume to be filled into the cavities in one row differs from the volume to be filled in the next row, the volume to filled into each row can be an input parameter.

When a cavity is not sufficiently filled, this can be, for example, corrected by adjusting the speed of the pump sDP. The system may be provided with increase/decrease, preferably input, means to adjust a change in behavior and/or properties of the food mass and/or compressibility of the food mass. These increase/decrease means can be part of every embodiment according to this invention, in which the filling of the cavities is at least partially volume controlled.

FIG. 9a shows a second embodiment of the invention of a volume controlled system. Feed pump 4 pumps a predetermined volume of food mass from hopper 3 and feed channel 12 into the cavities 9 of the mould drum.

In WO 2013107815 a portioning mode is described wherein the pump can rotate as long as the mould cavity overlaps the feed channel and the pump will deliver a pre-calculated volume of mass. FIG. 9b shows that the displacement of mass starts as soon as begin of mould cavity Bmc is in line with the beginning of feed channel Bfc and shows further that the displacement of mass stops as soon as the end of mould cavity Emc is in line with the beginning of feed channel Bfc. Hence, the predetermined volume of mass necessary to fill the cavity is displaced during a filling length Lf which corresponds with the length Lc of mould cavity 9 seen in circumferential direction of the drum. Here, o-sp is zero.

The length of the cavity Lc and the volume of the cavities in one row v-or (or the volume of one cavity v-oc times the number of cavities nr-c in one row) can be parameters inputted into the input source 15 and/or the control unit 16.

The control unit has now enough information to calculate the duration of every step to be made, the volume which the pump should displace during the filling time and the volumetric flow rate versus time can be calculated based on the characteristics of the pump. This is preferably automatically done by the control unit.

FIG. 9c is showing the absolute rotation angle of the pump and the absolute volume displaced by the pump over succeeding filling cycles of cavities. In this embodiment the rotor is kept in a stand still position after filling the cavity with result that the pressure is maintained on the mass. The person skilled in the art understands that, the pressure on the food mass in the feed channel can also, at least partially, be released, between two adjacent rows of cavities. In this case, the rotor of the feed pump is reversed by some degrees.

In FIG. 9b the food mass will be displaced into a cavity over a length Lc seen in circumferential direction of the drum. However, displacement of mass is not limited to this length. The mass can be displaced likewise over a shorter distance or a longer distance.

In case the distance of mass displacement is chosen shorter than Lc, the starting point to fill the cavity will not necessarily start as soon as Bmc passes Bfc, but can be delayed, which will be preset by the offset parameter o-sp.

A prerequisite is that no mass flows from the feed channel into the cavity during the offset period. The same is true in case the distance of mass displacement is equal to Lc but shorter than Lc+Wfc. The longest possible distance of mass displacement is the length of cavity Lc added to the width Wfc of feed channel 12. This longest possible distance is in FIG. 9d represented by angle "alfa". The longer the filling length Lc, the more gentle the filling can be executed which can result in better product quality and/or in less deviation of the mass and/or the form of the product.

Figure 9:
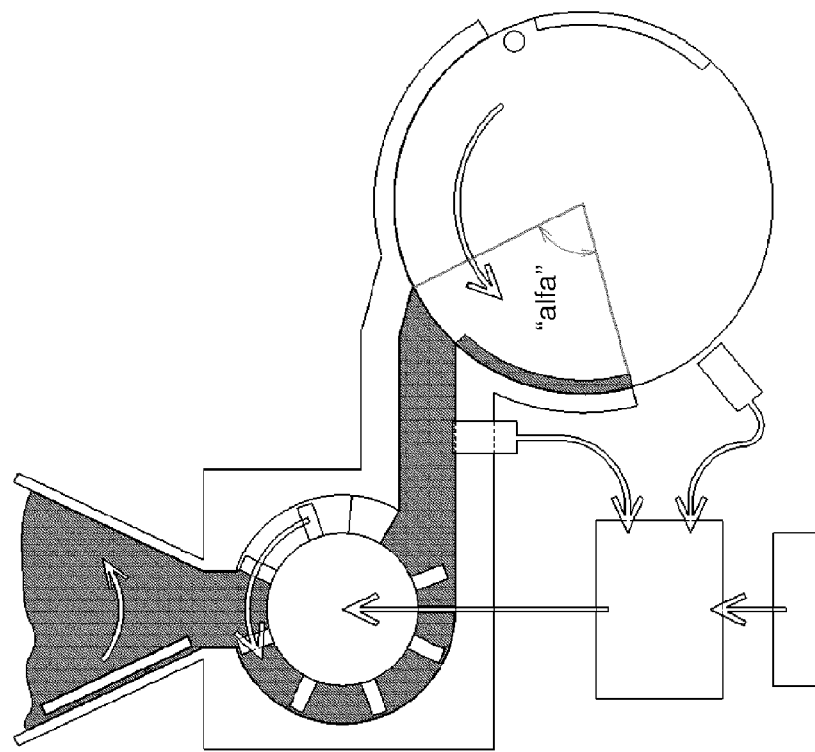
Figure 9:
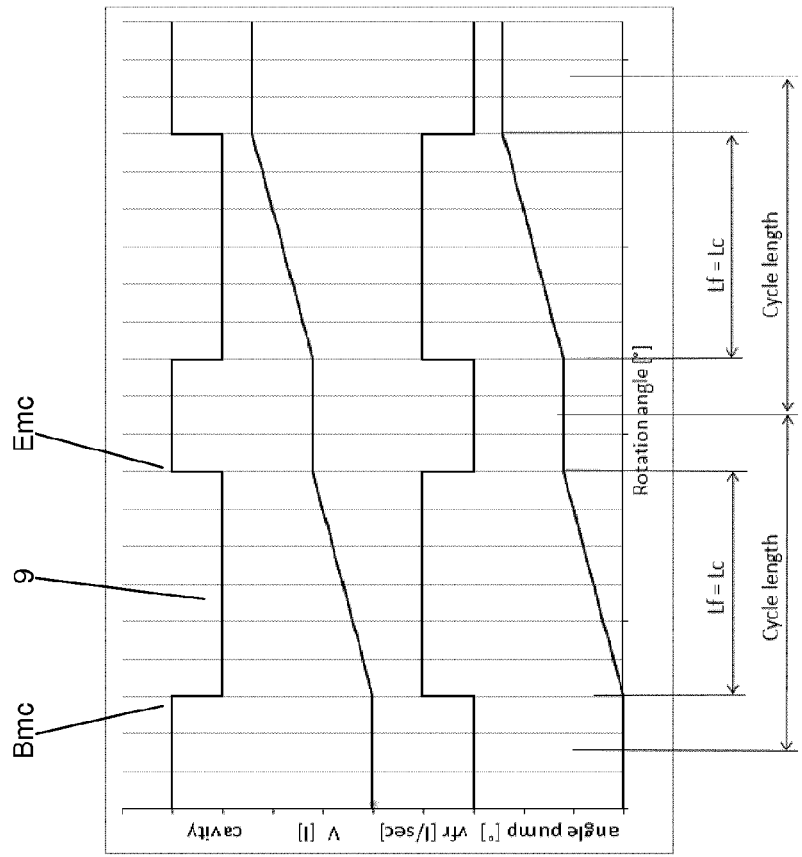

In case, inaccuracies, for example in weight and/or regarding the shape of the food product, occur for example due to response times of sensors, PLC, control unit and/or the inertia of mass, the filling of a cavity can be critical in a volume controlled system as shown in FIGS. 8 and 9. The control unit has calculated the speed of the pump sDP based on the length in circumferential direction of the drum and the rotational speed of the drum in which the cavities should be filled. For example in FIG. 9b, in case the starting point is delayed the cavities will not be filled entirely anymore. This effect is getting worse as the cavities are positioned in a short distance from each other on the drum and/or if the speed of the drum is relatively high.

Figure 10:
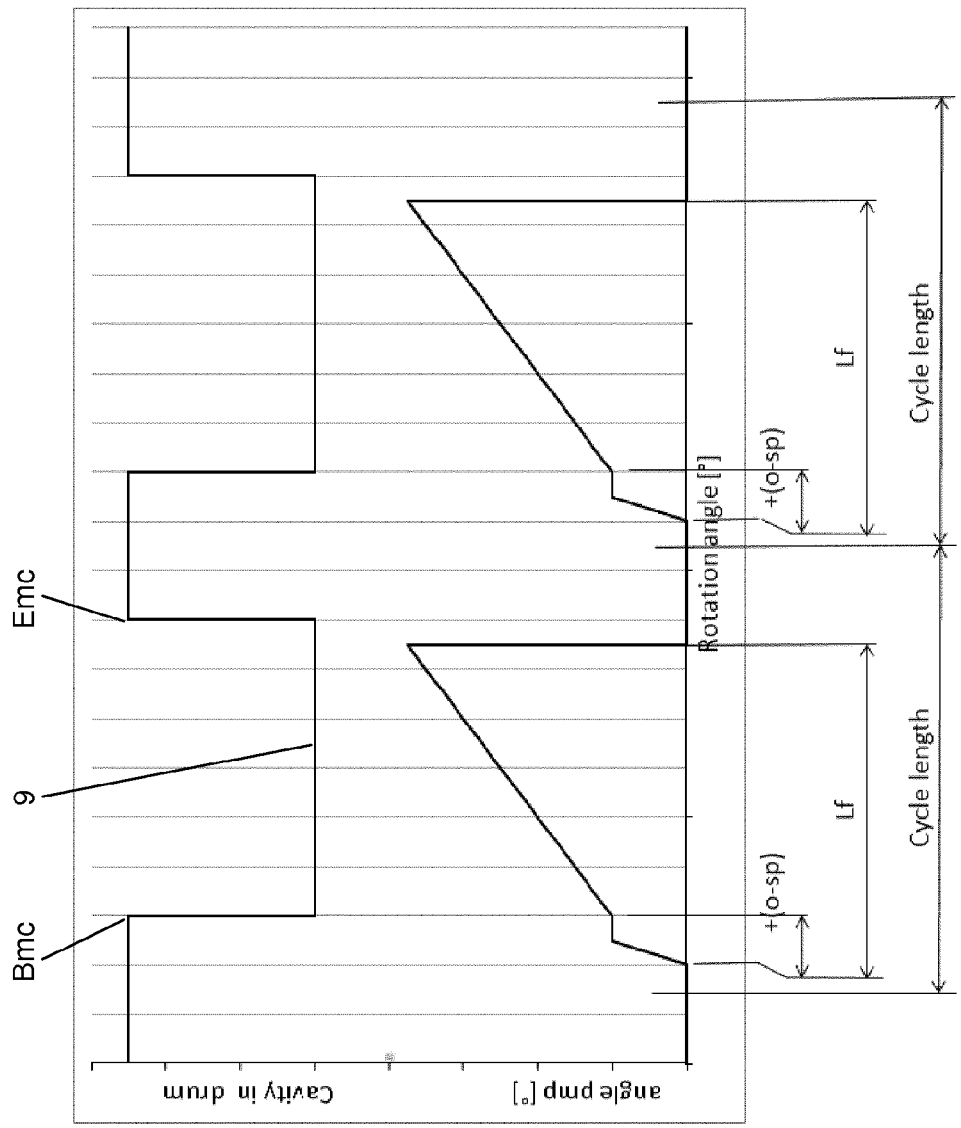

A third embodiment of the invention of a volume controlled system which is less critical with respect to an entire filling of a cavity as shown in FIG. 10. This figure is based on the volume profile of FIG. 9b but not limited to this profile. The pump has already been rotated over a certain angle even before the beginning of mould cavity Bmc passes the beginning of the feed channel Bfc. This rotation angle represents a pre-displaced volume of mass. While the cavity is not yet underneath the feed channel, the mass will not flow but will be compressed due to the increased pressure in the feed channel. This increase in pressure before the filling due to the rotation of the pump (angle pump) is shown in FIG. 10 by offset parameter o-sp. As soon as the beginning of mould cavity Bmc passes the beginning of the feed channel Bfc the pressurized mass in the feed channel will be, due to volume of the empty cavity, decompress and as a result of the expansion, the mass will flow into the cavity.

The predetermined volume of mass necessary to fill the cavity is displaced during a filling length Lf which can be shorter but is preferably equal or larger than length Lc of mould cavity 9 seen in circumferential direction of the drum. The parameter Lf is together with the parameter o-sp an input parameter inputted into an input source and/or the control system. The desired Lf can determine the speed of the pump sDP during displacement of the residual volume (predetermined and/or calculated volume of the cavity minus the pre-displaced volume of mass in the cavity).

After filling the cavity, the pressure on the mass can be released but preferably, to overcome inaccuracies in the control system due to the above mentioned delays, the pressure should be maintained on the mass at least somewhat longer than the calculated instant in which the end of mould cavity Emc will pass the begin of feed channel Bfc (or Efc, depending on the volume profile). An extended pressure on the food mass can also improve the consistency of the resulting food product.

In a volume controlled system as described in FIGS. 8, 9 and 10, no control over the pressure exerted on the food mass takes place, which may result in pressure peaks. The actual pressure during filling of the cavity is based on the torque the pump needs to rotate the pump with a pre-calculated speed to displace the calculated volume within a calculated period of time. Difference in for example mass temperature will result in a different pressure. Difference in rotational speed of the drum will result in a difference in filling time and thus also in a difference in the pressure exerted on the food mass. Further the pressure will change in case the volume of the cavity changes (empty cavity versus a partially filled cavity) which is disadvantageous regarding processing delicate mass whereby the pressure on the mass may not exceed a certain pressure.

FIG. 11a shows a first embodiment of the invention of a combination of both a pressure and volume controlled system where the cavities will be filled based on a desired pressure. Therefore the control will be separated in two phases, a filling phase and a pressure controlled phase. This control system is based on the pressure controlled system of FIG. 5b and is extended with means to measure the displaced volume, e.g.

In the filling phase the pressure profile versus the rotation angle of the drum includes a desired pressure profile to fill the cavity. During filling the control unit 16 will measure the rotations of feed pump 4 such that the pressure controlled system knows how much volume is displaced at a certain moment.

FIG. 11b shows succeeding measurements A-D of the volume delivered at a certain moment in time during filling of a cavity and/or the already delivered volume at the instants A-D. Based on the measured values it can be calculated when a cavity will be entirely filled and the moment that the pressure can be reduced is represented by CP. However, in case it is preferred that the pressure will exert a longer period on the food mass in the feed channel this can be integrated in the pressure profile by delaying the moment the pressure will be reduced.

In this pressure controlled and volume controlled system pressure related input parameters are the desired pressure p-set, p-ba, p-ra, start point o-sp, speed of the pump sDP and/or the P, I and D settings. The volume related parameters are the volume of the cavities in one row v-or (or the volume of one cavity v-oc times the number of cavities nr-c in one row)

In case a cavity is not sufficiently filled, this can be corrected by adjusting offset value o-sp and/or the speed of the pump and/or changing the set pressure p-set and/or changing the speed of rotation of the drum.

FIG. 12 shows a first embodiment of the invention of a combination of both a volume and pressure controlled system wherein the cavities will be filled with a control system which is separated in two phases: a filling phase and a pressure controlled phase. The filling phase shown in FIG. 12 is based on the volume controlled system of FIG. 8. The pressure during this phase depends on the resistance between pump and mould member and can vary as a result of for example changing mass temperatures. To fill the mould cavity in a more controlled way, a second phase is added wherein the filling will be finalized to obtain a desired pressure of the finally formed product. This second phase will result in products which all have been formed with the same pressure what will result in equal product weights and an equal surface finish for all formed products. Therefore the control system is configured with pressure measuring means 17. Signal p-fc (actual pressure in the feed channel) will be used in control unit 16.

FIG. 12b shows the first phase of the filling of the cavity. This phase is volume controlled. The volume profile versus the rotational angle of the drum includes a desired volume profile to fill the cavity but not entirely but only to a certain degree in order to reserve time for the pressure controlled phase. The second phase of the filling is pressure controlled, i.e. the mass in the feed channel is exerted to a certain pressure and flows into the cavity until the cavity is entirely filled and/or the food mass in the cavity has a certain pressure.

When forming a thin product out of a delicate mass which only may be subjected to a low pressure, the cavity can be filled in this phase in a certain time frame with a volume of for example 60% till 80%. In case such a cavity will be filled up to for example 90% till 100% in the same time frame, the pressure on the mass will increase as a result of high flow resistance of the mass due to relative high volumetric displacement and due to the small flow area of the cavity. When forming a thick product, the cavity can in this phase be filled with a volume of for example 80% till 90%. The cavity can be filled with a higher speed than when forming a thin product without exceeding a certain pressure.

The moment that the filling phase will start is determined by offset parameter o-sp and the percentage of volume that will be displaced in the filling phase by input parameter % vc. The time frame of the volume controlled part will be determined by an input parameter, for example Lvc (filling length of the volume controlled part) and/or can be determined automatically by control unit 16 (for example Lvc is equal to % vc/100 multiplied by percentage of cavity length Lc). Therefore the control unit needs to know the volume of the cavities in one row v-or (or the volume of one cavity v-oc times the number of cavities nr-c in one row).

The instant that the second phase of the filling, the pressure controlled phase, is started is represented by CP. In the pressure controlled phase the cavity will be further filled with a pre-set pressure which is an input parameter till the cavity is entirely filled. The pressure related input parameters are the desired pressure p-set, p-ba, p-ra, speed of the pump sDP and the P, I and/or D settings. Preferably, the pressure controlled phase stops as soon as Emc passes Efc.

The lowest pressure to fill cavities can be achieved by making use of the longest possible distance of mass displacement (the sum of volume controlled filling phase+ pressure controlled phase). This longest possible filling length Lf is the length of cavity Lc added with width Wfc of feed channel 12. In case the cavity will be filled in the volume controlled filling phase with for example 95% of the longest possible filling length Lf, there is probably not sufficient time anymore for the pressure controlled phase. Therefore the distance of mass displacement is preferably equal or slightly longer than Lc but shorter than Lc+Wfc."

When a cavity is not sufficiently filled, this can be corrected by adjusting offset value o-sp and/or % vc/Lvc and/or changing the set pressure p-set.

Figure 13:
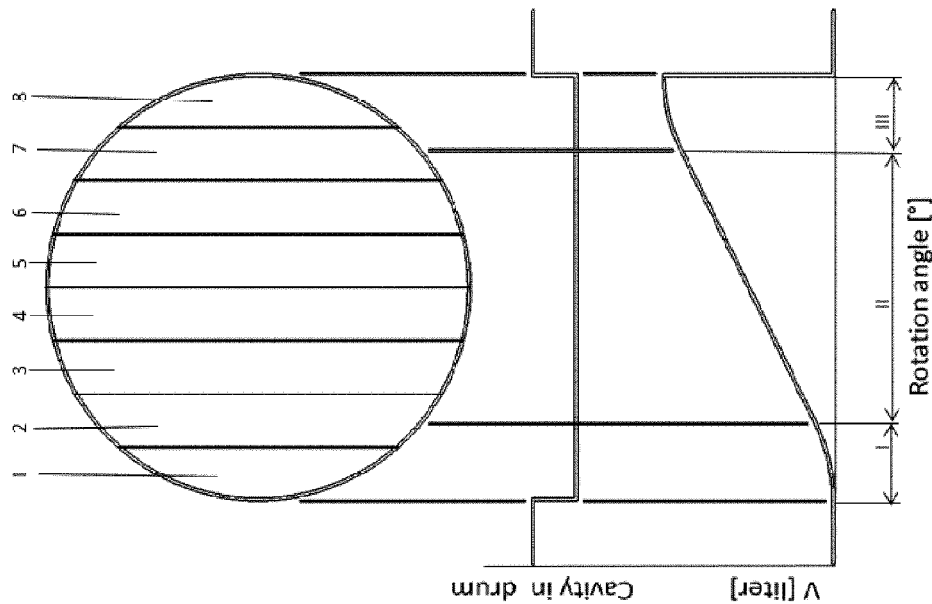
FIGS. 13a-13b show embodiments of a third inventive method.
Figure 13:
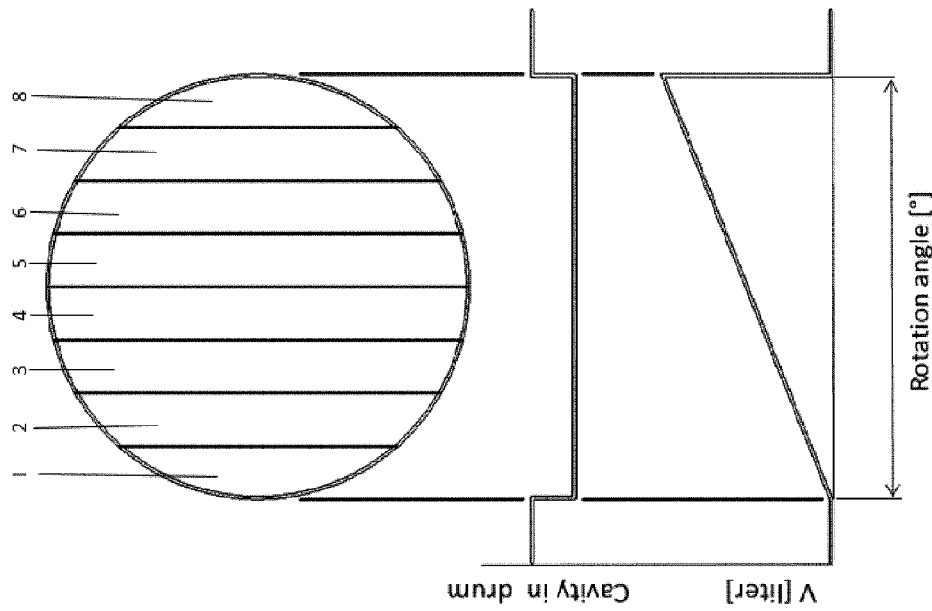

The graph in FIG. 13a shows the volume profile V displaced by the pump versus the rotational angle of the drum relative to the position of the cavity in circumferential direction of the drum. This figure corresponds to the volume profile versus the rotation angle of the drum shown in FIG. 9b but is not limited to this filling profile and/or this control system. In case the cavity is for example round shaped as shown in FIG. 13a volume profile in this figure can result in an uneven filled mould cavity and thus in an unacceptable product. In FIG. 13a a top view of the mould cavity is divided in 8 segments. During rotation of the drum the first segment 1, then segment 2, etc will be in contact with the feed channel. The surface area of segment 1 is smaller than the surface segment 2, 3 and 4 etc. In FIG. 13a the pump will, due to a constant pump speed sDP, displace in every segment the same volume of food mass into the mould cavity. Mainly depending on the flow characteristic of the food mass, the distribution of the food mass inside the cavity will differ from segment to segment and after filling the entire cavity this can result in an uneven density especially between segment 1 and 4 and between 5 and 8.

This shortcoming can be avoided in an embodiment of the invention which is shown in FIG. 13b. The distribution relative to the volumetric flow rate of the food mass inside each segment 1-8 of the cavity is kept essentially, preferably entirely constant by adapting the volume profile versus the angle of rotation of the pump to the shape of the cavity. This results in an adaptation of the volume flow rate provided by the pump during the filling of a mould cavity preferably to the shape of the mould cavity in a direction perpendicular to the direction of motion of the cavity. In part I and III a relatively low volume of food mass will be discharged into the cavity and in part II a relatively high volume of food mass will be delivered into the mould cavity. The volumetric flow of mass will be varied and related to the shape of a segment of the cavity. Result will be that even with food mass with a poor flow characteristics a more equal density over the total surface area of the formed product will be obtained. When splitting up the volume versus angle of rotation in even more than 3 parts a further optimization of filling the cavity will be achieved. During and/or after a heat treatment process such as cooking the shape of the formed product will remain.

Figure 14:
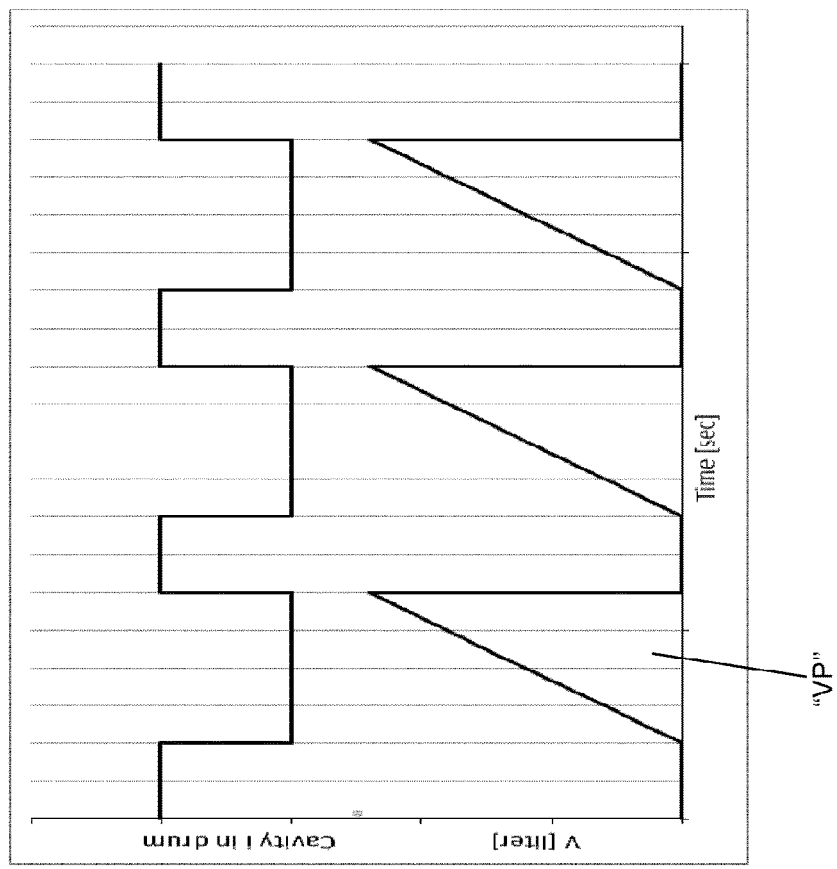
FIGS. 14a-14b show the automatic adjustment of the set pressure.
Figure 14:
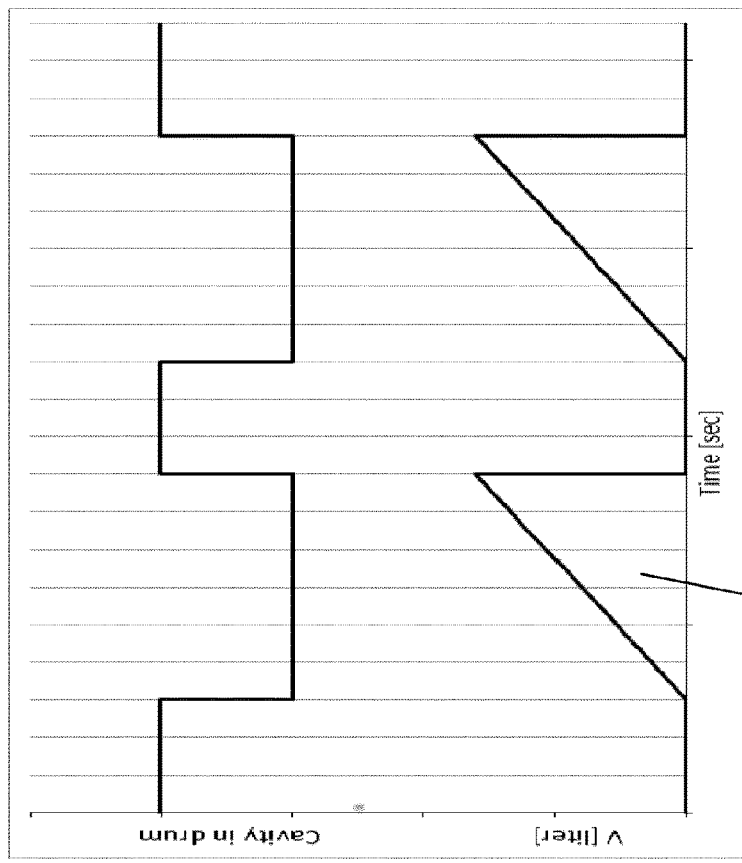

FIG. 14 shows an embodiment of the invention wherein an algorithm will be used within the control unit of a volume controlled system to anticipate a change in rotational speed of the drum. FIG. 14a corresponds to the filling mode described in FIG. 9b. A relatively long filling time is available to fill the cavity with food mass. The volume of food mass to be displaced to fill a mould cavity or a row of mould cavities is represented by the integral "VP". Due to the higher drum speed in FIG. 14b, the time available to fill the cavities in one row with mass is shorter. The used algorithm will now calculate the speed of the pump sDP necessary to fill the cavity in the available time and/or adjust the set pressure value to accelerate or decelerate the filling of the mould cavities.

In a pressure controlled system, when an operator will change the speed of the drum and does not change the pressure set value p-set, the available time to fill the cavities will be longer in case the drum speed will be reduced or will be shorter in case the drum speed will be increased. This will distort the filling. In case the drum speed will be reduced the cavities will be overfilled and in case the drum speed will be increased the cavities will not be filled entirely.

The preferred solution in a pressure controlled system is to change the pump speed sDP with approximately the same percentage as the speed of the drum is changed.

This embodiment of the invention is not limited to the shown filling profile and/or the discussed control systems.

Figure 15:
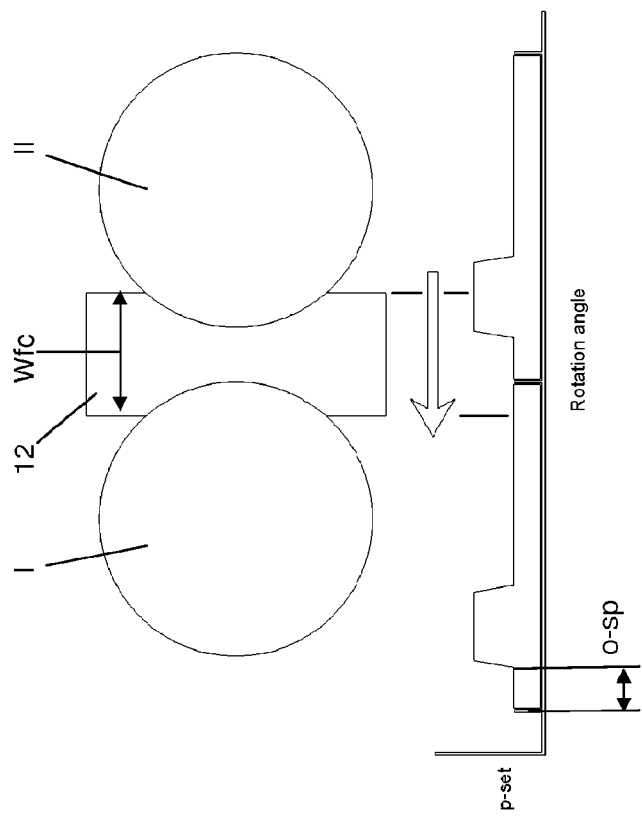
FIGS. 15a-15h show an embodiment of the inventive method in which the width of the feed channel is taken into account.
Figure 15:
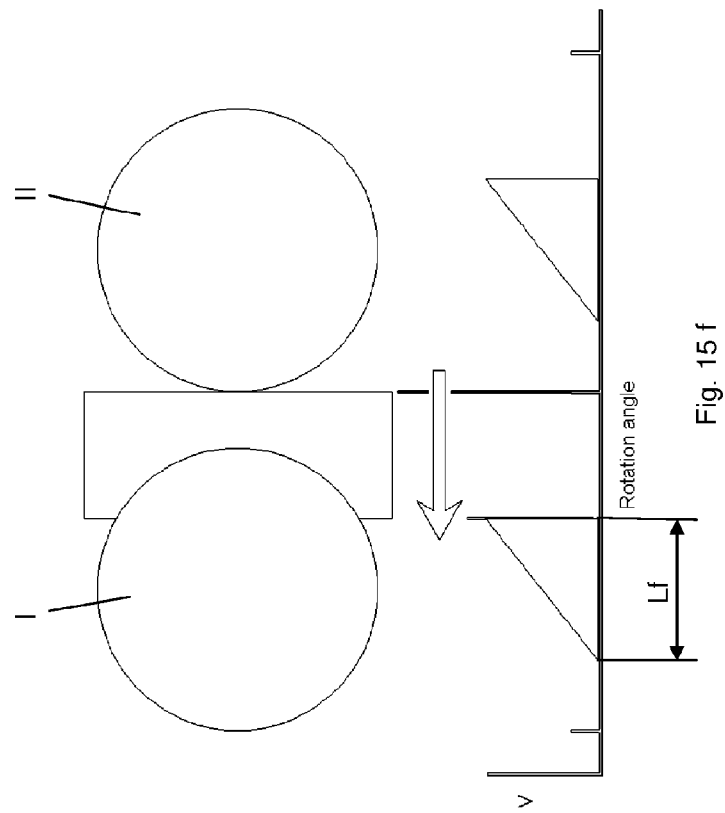
Figure 15:
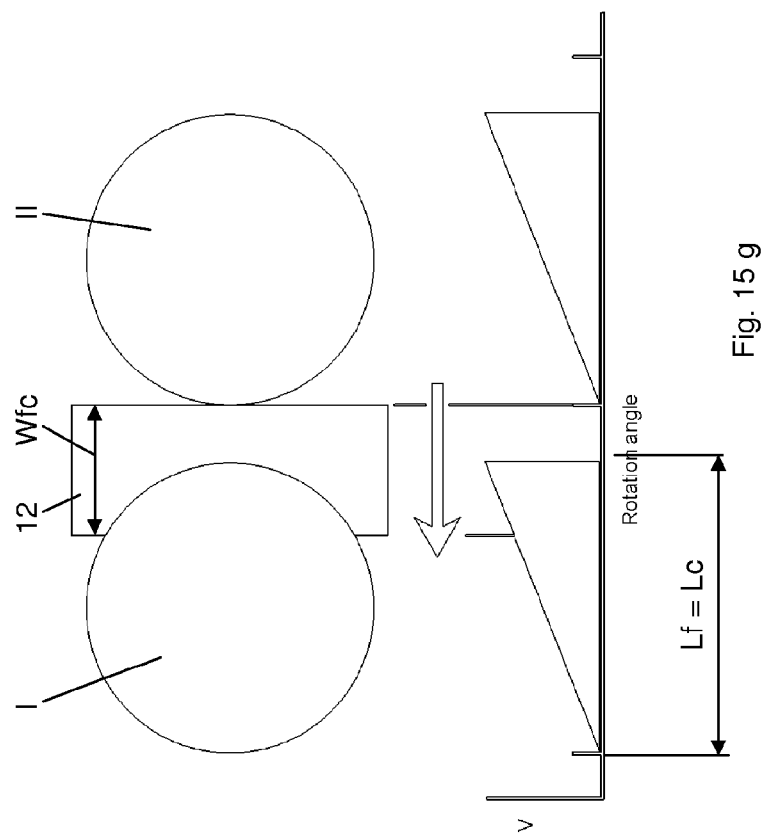
Figure 15:
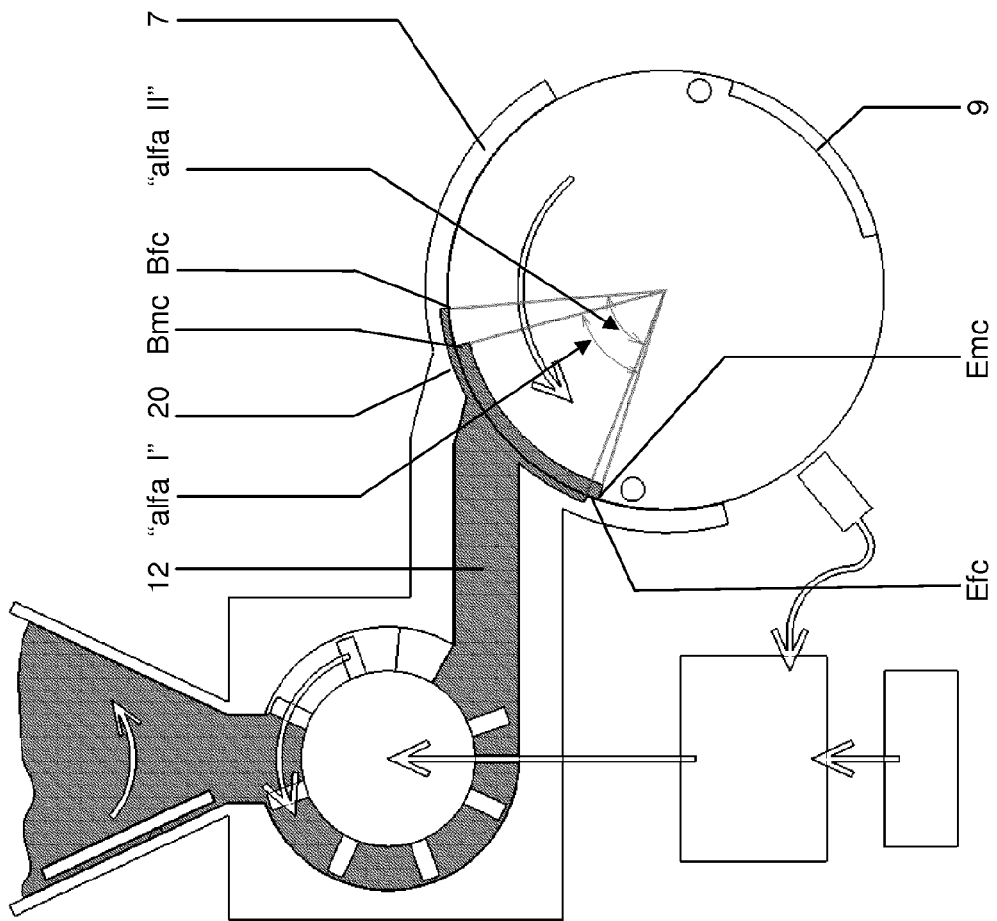

The above described filling methods are explained without taking the distance between products in circumferential direction of the drum into account. FIG. 15 shows embodiments of the invention wherein Wfc (width outlet feed channel 12) and/or a parameter related to Wfc will be an input parameter in the control unit and will be integrated in the calculation of the profile which will be used for the control system.

FIG. 15a shows, as an example, a pressure controlled system with the same pressure profile (the desired pressure p-set versus the rotational angle of the drum) as described in FIG. 6b. The filling of a cavity in row I is not influenced by the filling of a cavity in the subsequent row II due to the distance between two cavities in adjacent rows in circumferential direction of the drum which distance is equal or larger than Wfc.

FIG. 15b shows a pressure controlled system with the cavity of row I and row II within a distance of Wfc. Hence, the filling of two subsequent rows influence each other, so that this is not an example according to the present invention. After filling cavity I, the pressure in the feed channel is reduced in order to relax the food mass in cavity I. However, as soon as cavity II will come in communication with the feed channel 12, due to the chosen pressure profile the pressure in the feed channel has to be increased again and consequently this increased pressure will influence the density of the last part of cavity I which remains still in communication with the feed channel.

Depending mainly on the mass to be processed and the desired stability of the products to be formed further in the processing line, this effect of influenced filling will not have further disadvantages.

In case that influence is disadvantageous, a pressure profile (p-set versus rotational angle drum) can be used as shown in FIG. 15c. The food mass in the feed channel is only subjected to a pressure as long as only one row of cavities is in communication with the feed channel. Thus, during the overlap of the feed channel with two adjacent rows of cavities, the set pressure curve for the two cavities in two adjacent rows is equal, here zero. The period Lf that the mass is subjected to a pressure can be calculated within control unit 16 based on input parameters Lc, Wfc and the pitch between the cavities seen in circumferential direction drum. Offset o-sp can be calculated as follows: o-sp=Wfc−(length according the pitch between the cavities seen in circumferential direction drum—Lc). The length in circumferential direction drum that a set pressure will be applied to the mass Lf=Lc−(2*Offset o-sp). In practice a correction factor can be used due to overcome delays in the system.

FIG. 15d shows a pressure profile wherein filling of a cavity can take place partly with lower pre-set pressure as well as partly with higher pre-set pressure. The mass in the feed channel is only subjected to the higher pre-set pressure similar to FIG. 15c as long as only one row of cavities is in fluid communication with the feed channel with the result that filling of a cavity in one row will not influence filling of a cavity in another row. Thus, during the overlap of the feed channel with two adjacent rows of cavities, the set pressure curve for the two cavities in two adjacent rows is equal, here above zero. The period that the mass is subjected to the maximum pre-set pressure can be calculated in analogy to the calculation according to FIG. 15c.

In the embodiment according to FIG. 15d, the filling process will take place over a relatively long period of time (maximum over a length according the pitch between the cavities seen in circumferential direction drum) which will result in a lower maximum pressure on the food mass compare to FIG. 15c. The cavity can, depending on the pressure settings in segment 1 and 2 still be filled during segment 3. The food mass in the feed channel and thus the food mass in the cavity will be subjected to a minimum pre-set pressure as long as the end of mould cavity Emc has passed the end of feed channel Efc which is advantageous regarding the relatively long period that relaxation of the mass can take place and advantageous with respect to the prevention of backflow.

The starting point o-sp of the maximum pre-set pressure is in FIG. 15e advanced relative to the motion of the mould member shown by the arrow in comparison to the embodiment according to FIG. 15d. As soon as a cavity comes in fluid communication with the feed channel the actual pressure in the feed channel will drop due to food mass distribution from the feed channel into the empty cavity. In the embodiment of FIG. 15d this pressure drop is initially compensated by the minimum pre-set pressure. With respect to a rapid response the pressure drop is in FIG. 15e compensated by the maximum pre-set pressure to achieve that the actual pressure in the cavity increases more rapidly. After this stage, the cavity will be further filled and stabilized with a minimum pre-set pressure. Thus, during the overlap of the feed channel with two adjacent rows of cavities, the set pressure curve for the two cavities in two adjacent rows is equal, here above zero.

If this advanced starting point o-sp of the maximum pre-set pressure will influence the filling of a cavity in the previous filled row will mainly depend on the response time of the system and the rotational speed of the drum, in case this influencing will occur the starting point can be delayed with the parameter o-sp.

In FIG. 15f the cavity is filled with a volume controlled system and even though the distance between cavities in circumferential direction is relatively small still the filling of a cavity in row I is not influenced by the filling of a cavity in row II. As soon as the filling of a cavity is finished the feed pump will stop rotating and but can, depending on the mass to be processed, keep the food mass in feed channel 12 under pressure. The period that the food mass will be displaced by feed pump 4 can be calculated in analogy to the calculation in FIG. 15c: Offset o-sp=Wfc−(Length according the pitch between the cavities seen in circumferential direction drum—Lc). Filling length Lf=Lc−(2*Offset o-sp). In practice a correction factor can be used due to overcome delays in the system.

Volume control is limited to the dimension and configuration of cavities in a drum in relation to the dimension and configuration of the feed channel. FIG. 15g shows that the cavity is filled over a filling length Lf which is equal to length Lc seen in circumferential direction of the drum, a longer filling length Lf can result in an undefined situation.

In FIG. 15h a seal plate 7 is provided with a recess 20 adjacent the outer circumference of the drum which recess is represented by "alfa II". This recess preferably extends over the axial length of the seal plate and/or the same length as the outlet of the feed channel 12 and/or can be adapted to the shape of a cavity in the drum. The length of this recess in circumferential direction drum is equal or larger than the length of cavity Lc which is represented by "alfa I". During production, the mass will be distributed from the outlet of feed channel 12 into recess 20 and from there on into cavity 9 of the drum. By applying a recess in seal plate 7 the cavity will be filled over a longer period of time which can be advantageous depending on the used application.

These embodiments of the invention are not limited to the shown curve profiles and/or the discussed control systems.

Figure 16:
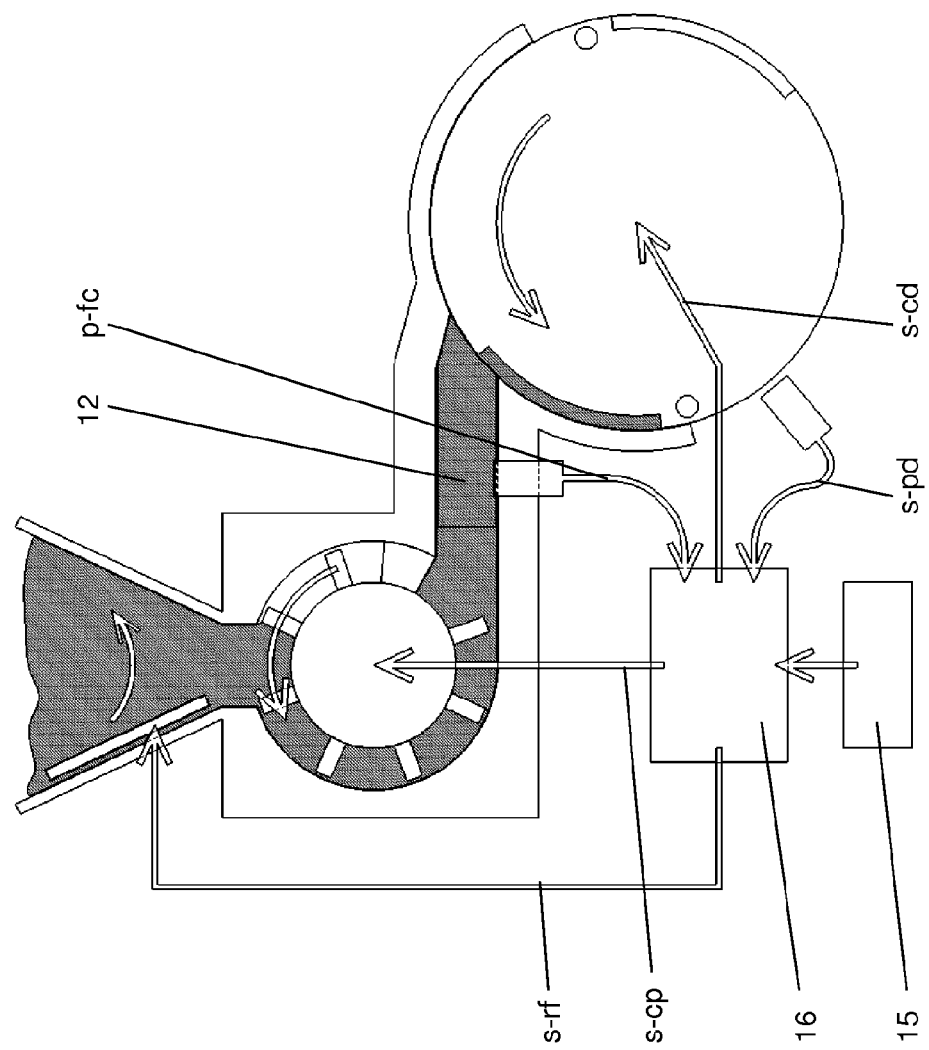
FIG. 16 shows the inventive food mass forming system

In FIG. 16 shows an even more sophisticated pressure and/or volume controlled system wherein a signal s-rf for movement of the rotating feeder and/or a signal s-cd for adjusting the speed of the drum can be used in combination with signal s-cp (movement feed pump) and/or input signal s-pd (actual position cavities and/or drum) and/or input signal p-fc (actual pressure of the mass in feed channel 12). Reference can also be made to WO 2013107815 wherein a control system is described wherein already the movement of the rotating feeder and/or the movement of the drum is integrated and wherein sensors are positioned to control the pressure over the width of the outlet of the pump chamber and the width of the drum.

LIST OF REFERENCE SIGNS 1 food product forming apparatus
2 mass supply system 3 hopper
4 feed pump/pump system
5 mass transport means
6 divider
7 seal, seal plate
8 mould member, Mould drum, Mould plate
9 mould cavity
10 rib
11 porous structure
12 feed channel
13 detection means position cavities and/or drum e.g. sensor, encoder
14 cavity and/or drum position point, for example a cam
15 parameter input source e.g. operating panel
16 control unit
17 pressure measuring means e.g. sensor
Bmc begin mould cavity seen in rotational direction drum
Emc end mould cavity seen in rotational direction drum
Bfc begin feed channel
Efc end feed channel, cutting edge
Lc length of the mould cavity in circumferential direction of the drum
Lf distance covered by cavity during volume controlled filling
Lvc filling length volume controlled part
o-sp offset to advance or delay the starting point of the pressure and/or volume displacement
o-ep offset to advance or delay the stop point of the pressure and/or volume displacement
p-fc actual pressure of the mass in the feed channel
p-set desired set pressure
p-ba pressure build-up angle
p-ra pressure reduction angle
vfr volumetric flow rate of the food mass
v-or volume cavities in one row
v-oc volume one cavity
nr-c number of cavities in one row
sMM speed mould member
sDP rotation speed of the pump
s-pd signal actual position cavities and/or drum
s-rf signal movement rotating feeder from control unit to feeder
s-cp signal movement feed pump from control unit to pump and/or vice versa
s-cd signal movement drum from control unit to drum and/or vice versa
Wfc width outlet feed channel in circumferential direction drum
% vc percentage of volume that will be displaced in the filling phase

The invention claimed is:

1. A method for moulding products from a mass of food stuff, the method comprising:
   moving a mould cavity, which is part of a mould member, past a feed channel, the feed channel is connected to a feed pump that pumps the mass of food stuff through the feed channel and into the mould cavity,
   determining and/or detecting a position of the mould cavity relative to the feed channel,
   controlling the feed pump,
   wherein filling of the mould cavity is partially carried out by controlling a pressure of the feed pump and partially by controlling a displaced volume of the feed pump and/or a flow rate of the feed pump, and
   during the filling, the method comprises: increasing a desired set pressure based on the position of the mould cavity relative to the feed channel while the mould cavity is being filled and then decreasing the desired set pressure based on the position of the mould cavity relative to the feed channel while the mould cavity is being filled.

2. The method according to claim 1, wherein the mould cavity is firstly filled by controlling the displaced volume of the feed pump and/or the flow rate of the feed pump and then by controlling the pressure of the feed pump.

3. The method according to claim 1, wherein the flow rate of the feed pump is not constant during the filling of the mould cavity.

4. The method according to claim 1, wherein a volume of the mass of food stuff already filled in the mould cavity is measured at least once during the filling.

5. The method according to claim 4, wherein a flow rate of the mass of food stuff is adjusted based upon the measured volume of the mass of food stuff.

* * * * *